(12) United States Patent
Harrison et al.

(10) Patent No.: US 11,142,319 B1
(45) Date of Patent: Oct. 12, 2021

(54) AIR CONTAINER TRANSPORT ASSISTANCE TOOLS AND RELATED SYSTEMS

(71) Applicant: Amazon Technologies, Inc., Seattle, WA (US)

(72) Inventors: Samuel F. Harrison, Lynnwood, WA (US); Aliaksandr Antsipau, Auburn, WA (US); Sebastian Bahamonde, Seattle, WA (US); Tiffany Lynn Cremer, Seattle, WA (US); Andrew John Gawne, Renton, WA (US); Jason T. Laib, Cincinnati, OH (US); Racha Lwali, Tacoma, WA (US); Sean O. Maylone, Seattle, WA (US); Steven M. Smith, Edmonds, WA (US); Andrew Kyle Winn, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 332 days.

(21) Appl. No.: 16/263,538

(22) Filed: Jan. 31, 2019

(51) Int. Cl.
  *B23Q 1/25* (2006.01)
  *B64D 9/00* (2006.01)
  *B64C 1/20* (2006.01)

(52) U.S. Cl.
  CPC .............. *B64D 9/003* (2013.01); *B23Q 1/25* (2013.01); *B64C 1/20* (2013.01)

(58) Field of Classification Search
  CPC .. B64D 9/00; B64D 9/003; B64C 1/18; B64C 1/20; B65D 2501/24363–24503; B65D 2303/00; B65D 2519/00776; B65D 2519/00781; B65D 2519/00791; B65D 88/14; B65D 19/38; B65D 90/00; B65D 90/0013; B65D 2525/00; B65D 2525/28; B65D 2525/281; B65D 2525/289; B65D 2525/285; B25G 3/00; B25G 3/20; B25G 3/24; B25G 3/28; B64F 5/50; B62B 2202/10; B62B 2203/72; B66F 19/00; B65G 7/00–12; Y10T 16/4559; Y10T 16/4567; Y10T 16/4569
  See application file for complete search history.

(56) References Cited

U.S. PATENT DOCUMENTS 1,319,324 A * 10/1919 Clement ................. A45F 5/102
                                                    294/137
3,005,651 A * 10/1961 Flaker ..................... B65G 7/12
                                                    294/26

(Continued)

*Primary Examiner* — Tyrone V Hall, Jr.
(74) *Attorney, Agent, or Firm* — BakerHostetler

(57) ABSTRACT

A tool includes a handle, an extension member extending from the handle, and an anchor assembly coupled to the extension member opposite the handle. The anchor assembly is configured for selective anchoring to a seat track of an air cargo pallet, and the anchor assembly includes at least one locking member that is movable between an unlocked position and a locked position. In particular, when the at least one locking member is in the unlocked position, the at least one locking member is configured to advance into a slot of the seat track. When the at least one tool is in the locked position, the at least one locking member is configured to mechanically interfere with at least a portion of the seat track in a manner retaining the at least one locking member in the slot, thereby anchoring the anchor assembly to the seat track.

20 Claims, 14 Drawing Sheets

(56) References Cited

U.S. PATENT DOCUMENTS

| | | | | |
|---|---|---|---|---|
| 4,020,770 A | * | 5/1977 | McLennan | B60P 7/0815 |
| | | | | 410/105 |
| 5,249,908 A | * | 10/1993 | Tsai | B62B 3/0606 |
| | | | | 280/46 |
| 5,582,114 A | * | 12/1996 | Feiner | B65D 19/0034 |
| | | | | 108/50.11 |
| 7,980,798 B1 | * | 7/2011 | Kuehn | B60P 7/0815 |
| | | | | 410/104 |
| 10,245,885 B2 | * | 4/2019 | Davis | B60B 33/02 |
| 2008/0107511 A1 | * | 5/2008 | Oberg | B62B 1/268 |
| | | | | 414/445 |

\* cited by examiner

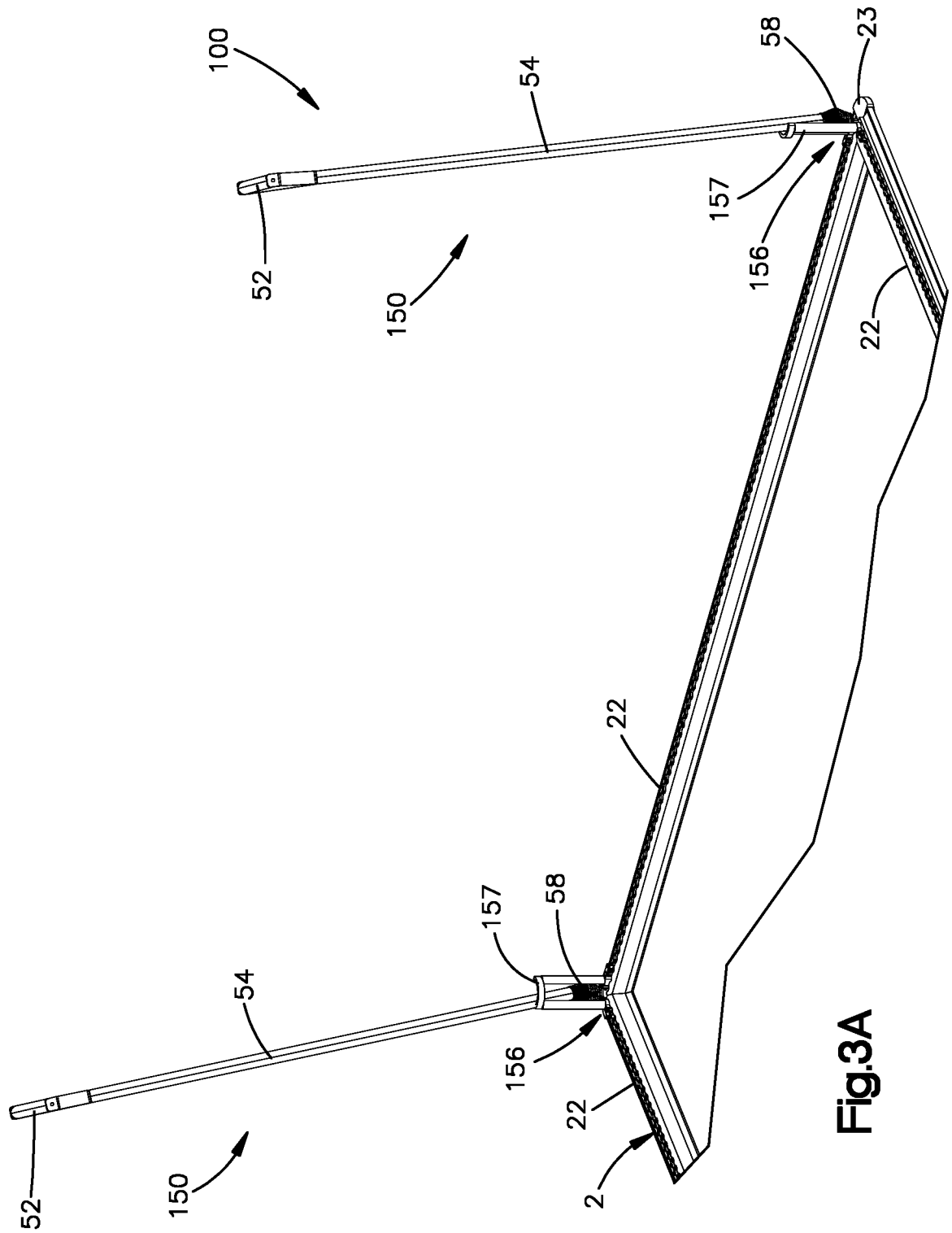

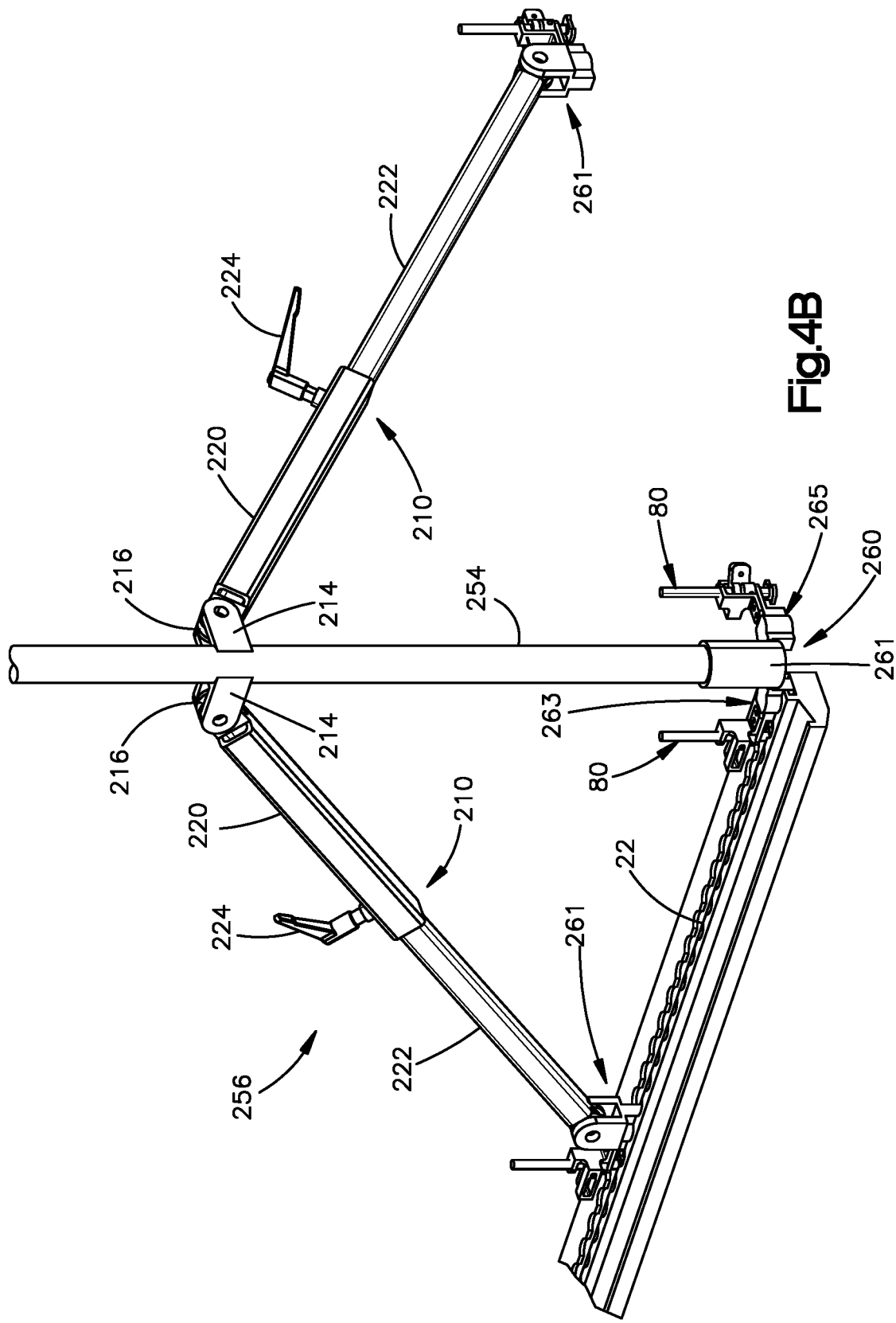

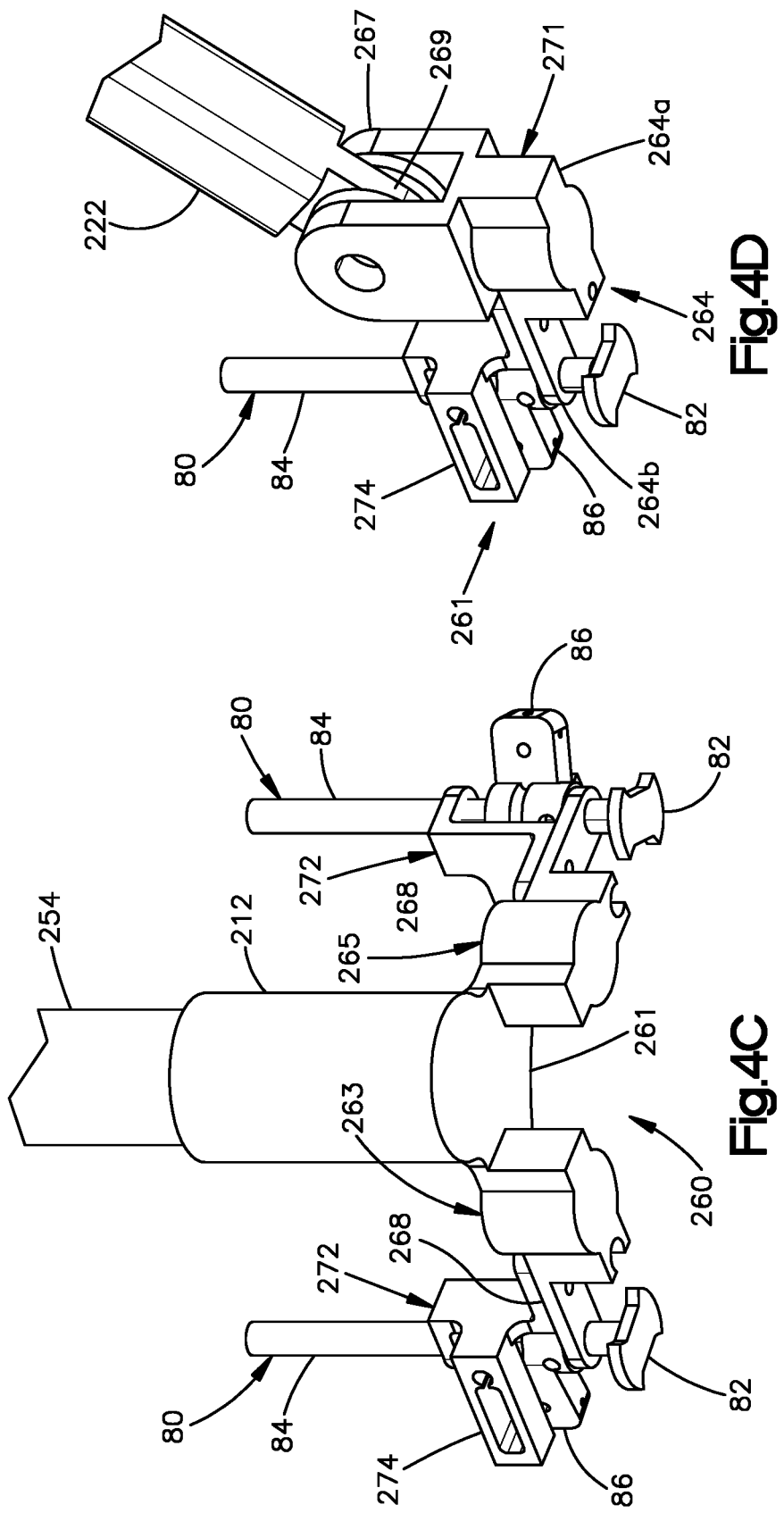

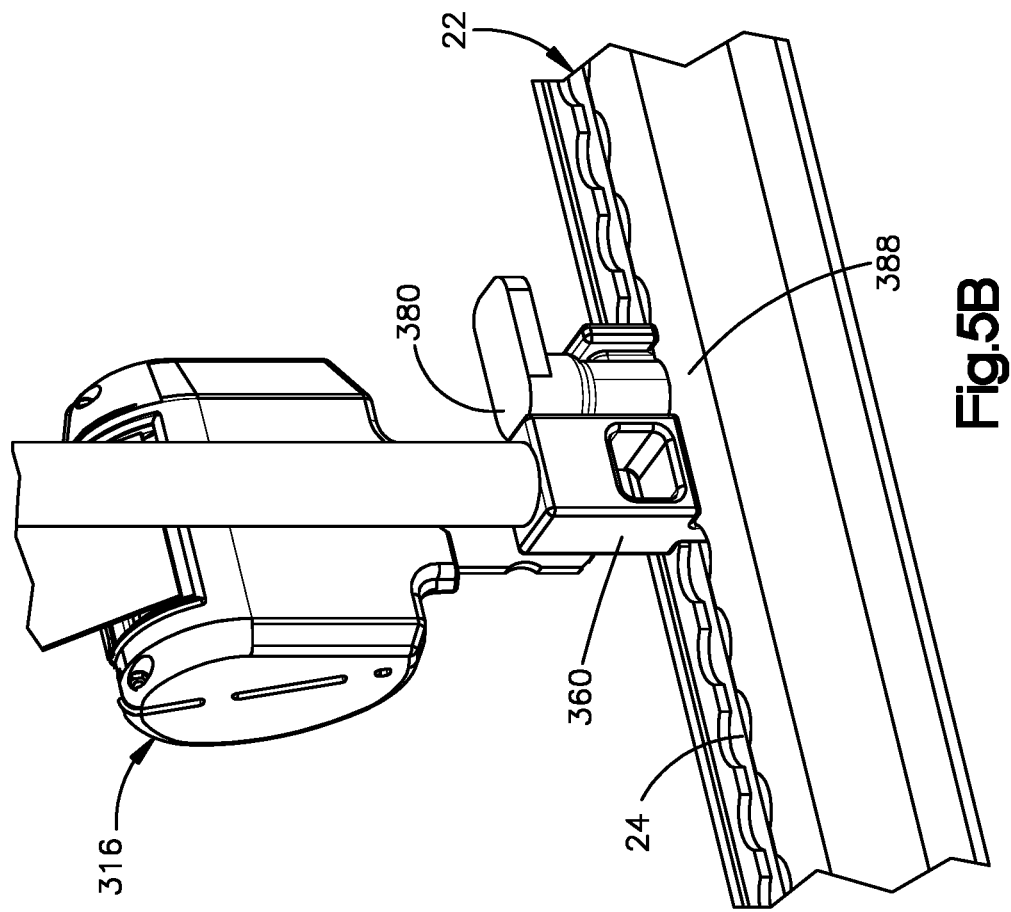
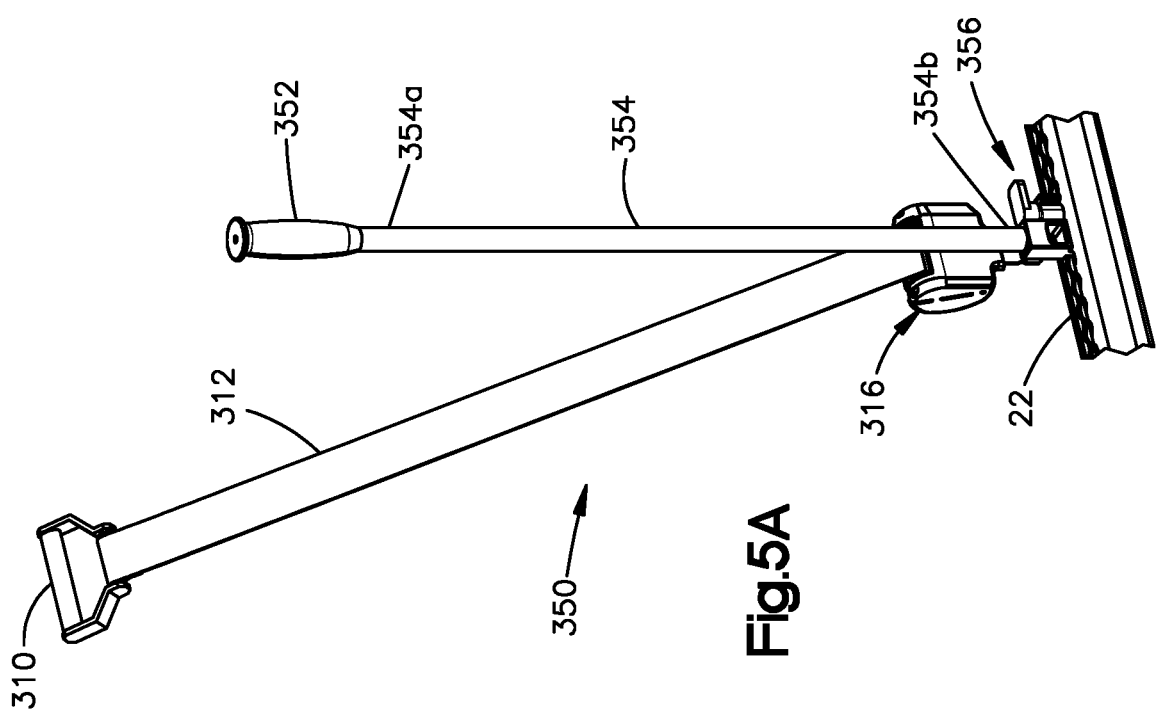

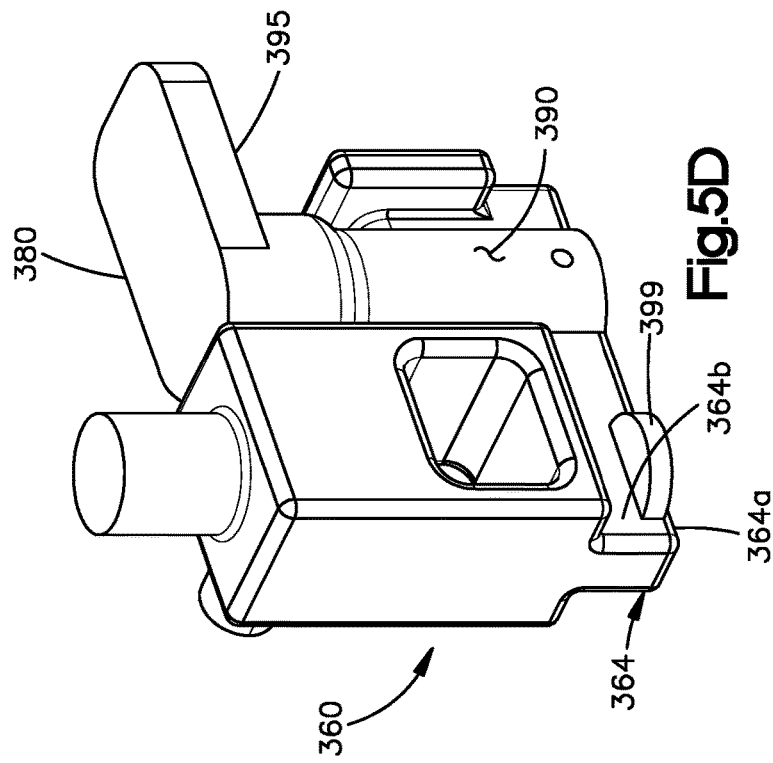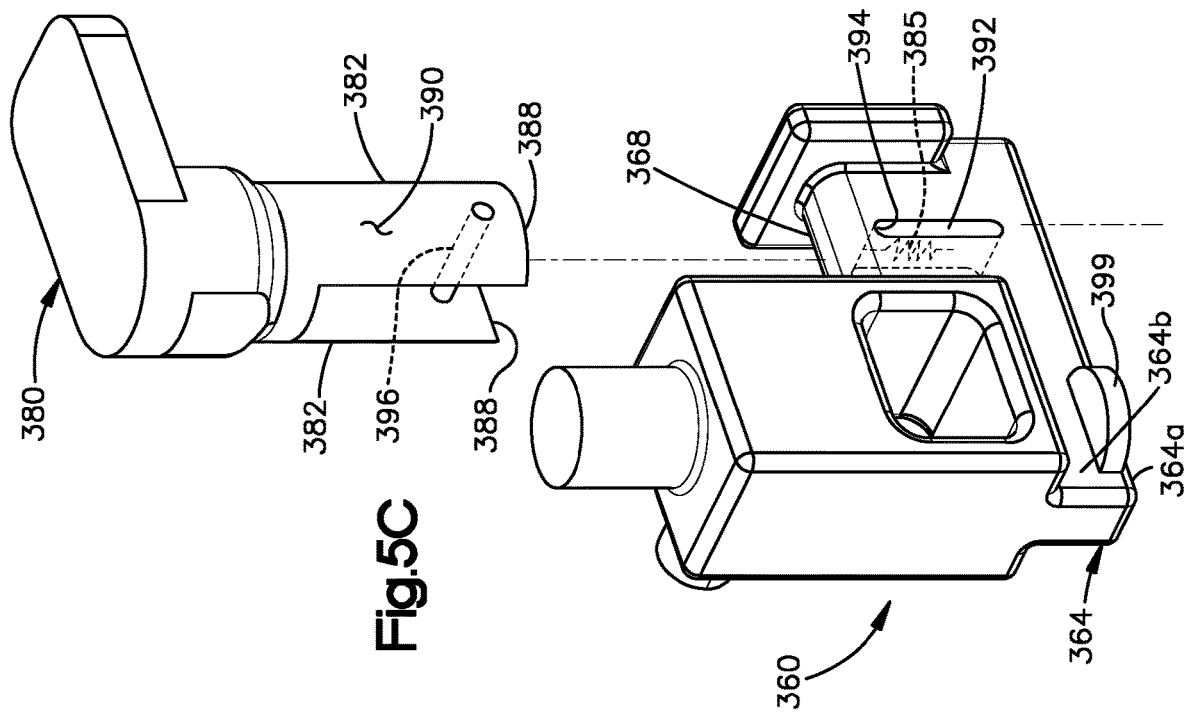

AIR CONTAINER TRANSPORT ASSISTANCE TOOLS AND RELATED SYSTEMS

BACKGROUND

The present invention relates to assistance tools for moving or otherwise manipulating Unit Load Devices (ULDs) for cargo aircraft, and more particularly to assistance tools that selectively anchor to ULDs and have handles and other features for ergonomically manipulating the ULDs.

In an air cargo network, a variety of types of Unit Load Devices (ULDs) are used to store and handle air freight or cargo (e.g. packages) that is loaded into cargo aircraft. One such type of ULDs is an air cargo pallet (PAJ) that includes a flat, thin aluminum sheet having a width of 88 inches and a length of 125 inches. The flat sheet of the PAJ allows it to roll along roller-embedded surfaces (also referred to herein as "roller decking") in the cargo hold of aircraft and cargo handling areas in support facilities for loading and unloading cargo aircraft. One such type of roller decking is caster decking. The PAJ is configured to be loaded with stacked boxes or packages, such as boxes stacked on pallets and/or gaylords, for example. A fully loaded PAJ can have boxes stacked thereon up to 8 feet high. These boxes can be shrink-wrapped together for stability. To secure the stacked boxes to the PAJ, a retaining net can be placed over the stacked boxes and anchored to a netting track (e.g., a seat track) that extends around the periphery of the PAJ. Currently, moving both unloaded and loaded PAJ's presents a logistical challenge for workers. For example, within the cargo hold of an aircraft, workers may use their feet to unload PAJs across the roller decking. To move loaded PAJs across roller decking, associates currently push against the boxes stacked on the PAJ from behind or pull against the retaining net. Pushing a loaded PAJ from behind can be challenging because the worker may not be able to see what is in front of the PAJ. Also, the worker may have to bend to push the PAJ, particularly if the pallet(s) and/or gaylord(s) do not extend to the periphery of the PAJ. Moving a loaded PAJ by pulling on the retaining net involves similar challenges, including lack of visibility in the direction of movement and difficulty avoiding stepping on the unladen part of the PAJ.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 3A shows a perspective view of an assistance tool system that includes a pair of assistance tools anchored to the corner of the air pallet illustrated in FIG. 1A, wherein each of the assistance tools allows manual manipulation of the air pallet, according to another embodiment of the present disclosure;

FIG. 4B shows a perspective view of the tripod anchor assembly of the assistance tools illustrated in FIG. 4A;

FIG. 4C shows an enlarged perspective view of a central cleat of the tripod anchor assembly illustrated in FIG. 4B;

FIG. 4D shows an enlarged perspective view of a secondary cleat of a leg of the tripod anchor assembly illustrated in FIG. 4A;

FIG. 5A shows a perspective view of an assistance tool anchored to a seat track of the air pallet illustrated in FIG. 1A for manually manipulating the air pallet, wherein the assistance tool has a retractable pull-strap, according to an additional embodiment of the present disclosure;

FIG. 5B shows an enlarged perspective view of an anchor assembly of the assistance tool illustrated in FIG. 5A in a locked position;

FIG. 5C shows an exploded view of a cleat and a locking member of the anchor assembly illustrated in FIG. 5B; and FIG. 5D shows an enlarged perspective view of the anchor assembly of the assistance tool illustrated in FIG. 5A in an unlocked position.

DETAILED DESCRIPTION

The embodiments of the present disclosure pertain to assistance tools for manipulating or otherwise moving Unit Load Devices (ULDs), such as loaded or unloaded Air Cargo Pallets (e.g., PAJs) on roller decking installed in cargo aircraft and related support facilities. The assistance tools described herein anchor to the seat tracks of ULDs and have handles and other features allowing associates to ergonomically manipulate the ULDs on roller decking. Thus, to move the ULDs, associates need not use their feet to move unloaded ULDs across the roller decking, push against the boxes stacked on ULDs, or pull against the retaining nets of loaded ULDs. The easier, more controlled manipulation of ULDs provided by the assistance tools described herein increases the safety and efficiency of cargo loading and unloading on aircraft, and also reduces damage to packages on the ULDs.

Figure 1A:
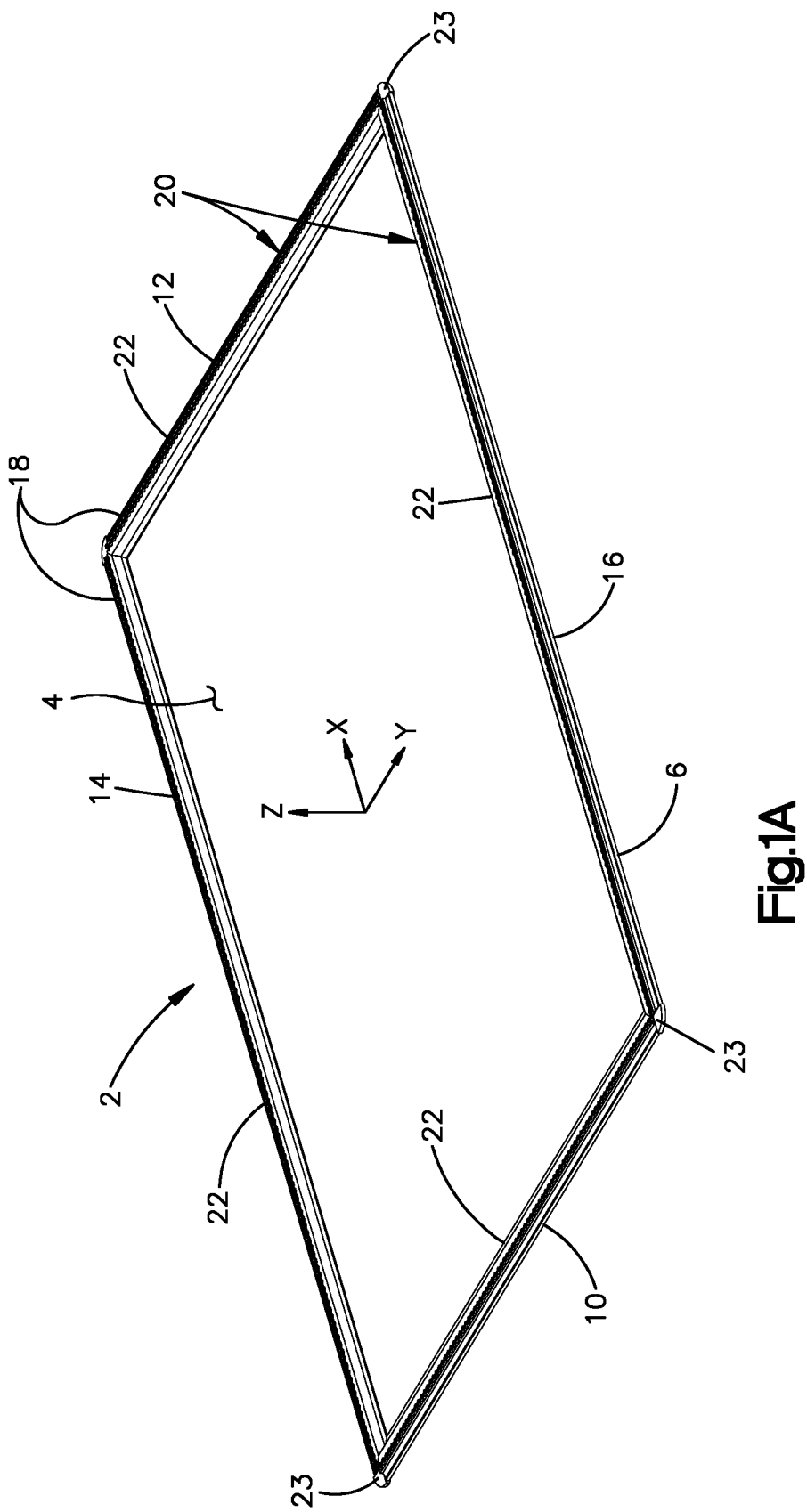
FIG. 1A shows a perspective view of a prior art air pallet.

Referring now to FIG. 1A, an air pallet 2 has an upward-facing, flat main surface 4 for holding cargo, such as stacked boxes and/or packages loaded onto gaylords or standard pallets. The air pallet 2 also has a flat bottom surface 6 for sliding across roller decking, such as caster decking. The main surface 4 and the bottom surface 6 are spaced from each other along a vertical direction Z. The air pallet 2 has a first end 10 a second end 12 spaced from each other along a first horizontal direction X, and a first side 14 and a second side 16 spaced from each other along a second horizontal direction Y that is perpendicular to the first horizontal direction X. The first and second horizontal directions X, Y are each perpendicular to the vertical direction Z. The first and second ends 10, 12 and the first and second sides 14, 16 define peripheral edges 18 of the air pallet 2. The air pallet 2 has a peripheral formation 20 that is elevated above the main surface 4. The peripheral formation 20 defines seat tracks 22 that extend along the peripheral edges 18 of the air pallet 2 and are configured for attachment of cargo netting thereto. The peripheral formation 20 also includes corner platforms 23 at the intersections of adjacent seat tracks 22.

Figure 1B:
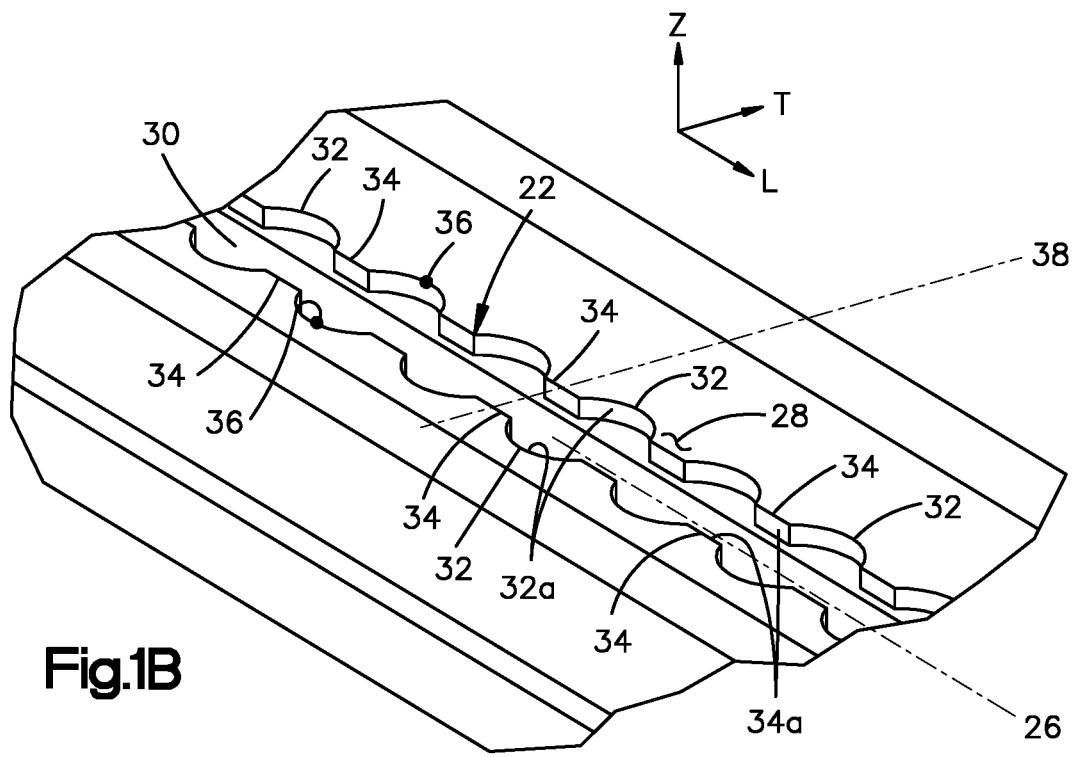
FIG. 1B shows an enlarged perspective view of netting tracks of the prior art air pallet illustrated in FIG. 1A.
Figure 1C:
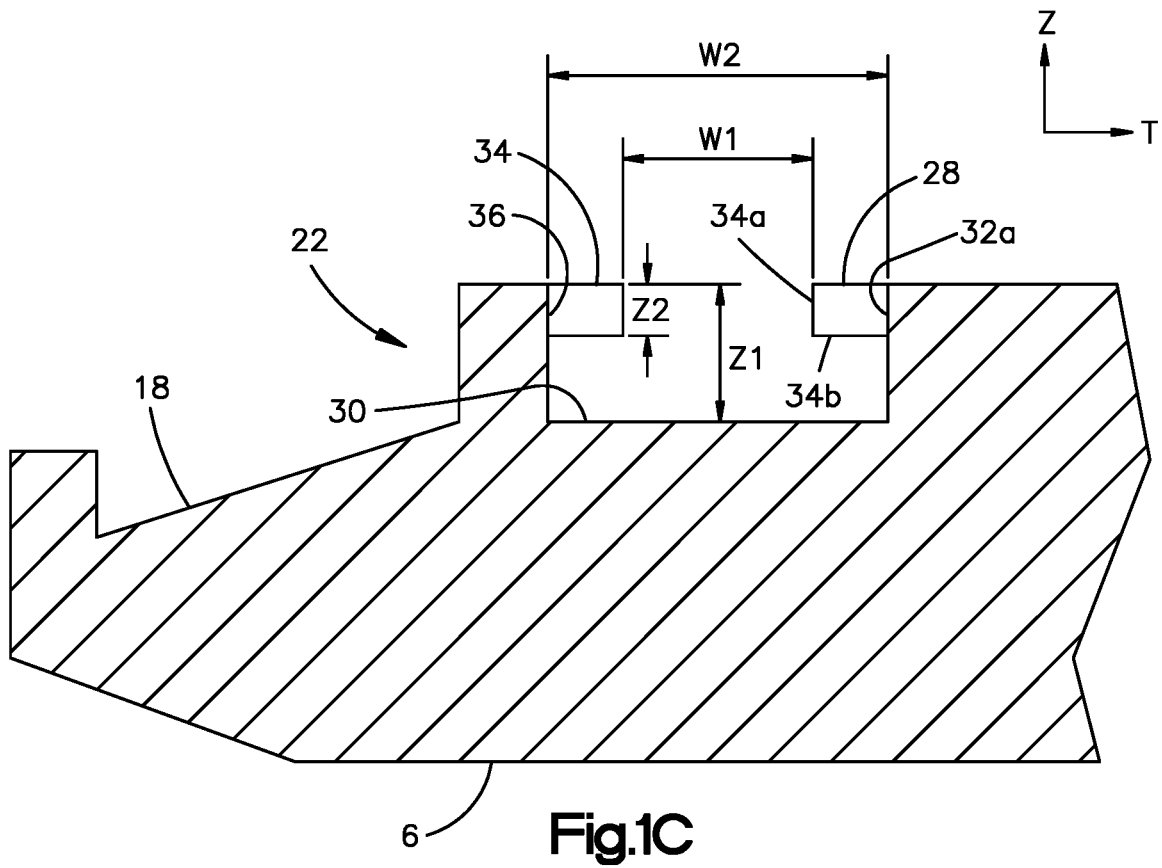
FIG. 1C shows a transverse sectional view of a netting track taken along section line 1C-1C illustrated in FIG. 1B.

Referring now to FIGS. 1B and 1C, the seat tracks 22 each have a channel or slot 24 (also referred to as the "track slot") elongate along a slot axis 26 that extends along a longitudinal direction L, which is parallel with the adjacent peripheral edge 18 of the air pallet 2 (and thus also parallel with either the first or second horizontal direction X, Y). Each track slot 24 extends along the vertical direction Z at a slot depth Z1 measured from a top track surface 28 to a bottom track surface 30. Each seat track 22 defines a plurality of openings 32 spaced sequentially in a series along the longitudinal direction L. The openings 32 are circular in shape and are spaced from each other by a series of protrusions or lobes 34 that extend inwardly into the track slot 24 along a transverse direction T perpendicular to the longitudinal direction L and the vertical direction Z. The lobes 34 are arranged in pairs, such that in each pair of lobes 34, a first lobe 34 and a second lobe 34 are spaced from each other and extend toward each other along the transverse direction T, such that an inner surface 34a of the first lobe 34 and an inner surface 34a of the second lobe 34 face each other and are spaced from each other by a minor slot width W1 measured along the transverse direction T. A major slot width W2 of each track slot 24 is measured from the apices 36 of each opening 32 along the transverse direction T. Adjacent lobes 34 along the longitudinal direction L are spaced from each other by a lobe spacing distance D1 measured between respective transverse lobe axes 38 that each extend along a centerline of the respective pair of lobes 34 and are each oriented along the transverse direction T. It is to be appreciated that inner surfaces 32a of the openings 32 define longitudinal sides 34c of the lobes 34, and vice versa. The inner surfaces 32a of the lobes 32 define a lobe depth Z2 measured from the top track surface 28 to a bottom lobe surface 34b. The lobe depth Z2 is less than the slot depth Z1, causing the bottom surfaces 34b of the lobes 32 to overhang the bottom track surface 30.

Figure 2A:
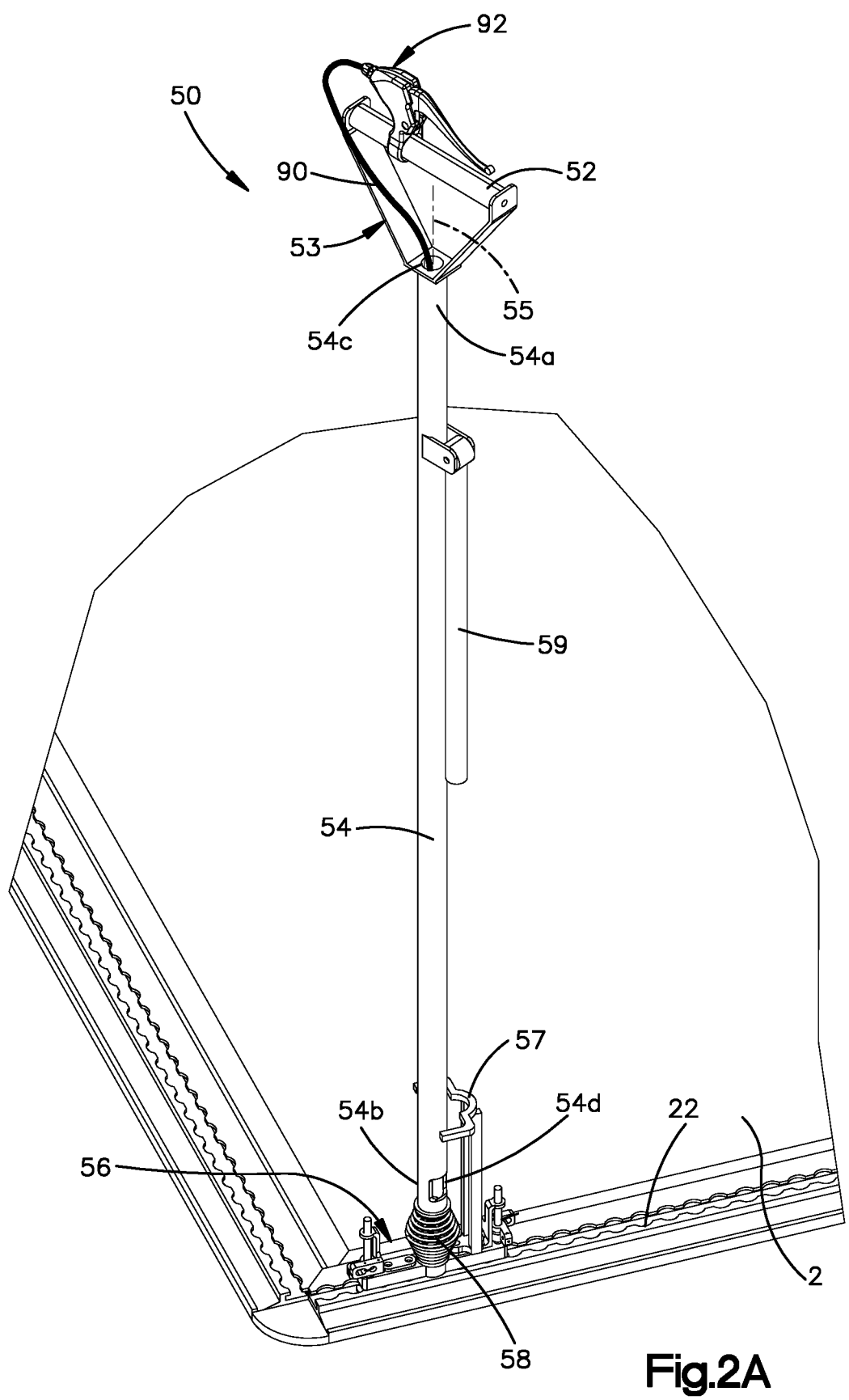
FIG. 2A shows a perspective view of an assistance tool anchored to the air pallet illustrated in FIG. 1A, wherein the assistance tool allows manual manipulation of the air pallet, according to a first embodiment of the present disclosure.

Referring now to FIG. 2A, an assistance tool 50 for manipulating the air pallet 2 across roller decking, such as caster decking, is shown according to a first example embodiment of the present disclosure. The assistance tool 50 includes a handle 52, an extension member or shaft 54 having a first end 54a extending from the handle, and an anchor assembly 56 coupled to a second, opposite end 54b of the shaft 54. The anchor assembly 56 is configured for selective affixation or anchoring to a portion of one of the seat tracks 22 of the air pallet 2. For example, the anchor assembly 56 can be coupled to a longitudinal midpoint of the seat track 22, although it can optionally be coupled at a location offset from the longitudinal midpoint of the seat track 22. With the anchor assembly 56 thus anchored to the air pallet 2, an associated can grip the handle 52 to manipulate the air pallet 2, particularly to pull the air pallet 2 across roller decking. Moreover, the assistance tool 50 can include features allowing a worker to push and/or rotate the air pallet 2 on roller decking, as will be described in more detail below. It is to be appreciated that the tool 50 of the present embodiment can be employed in a tool system that includes more than one such tool 50, such as a pair of the tools 50 anchored to different longitudinal locations of the same sheet track 22 or to different sheet tracks 22 of the same air pallet 2.

The handle 52 can be oriented perpendicular to the shaft 54, and can include a hand guard 53, although other handle 52 configurations are within the scope of the present disclosure. The shaft 54 can be hollow so as to define a central bore 54c that extends along a longitudinal shaft axis 55 and is in communication with a side aperture 54d near the second end 54b of the shaft 54. The handle 52 can optionally be configured to rotate about the longitudinal shaft axis 55. The second end 54b of the shaft 54 can be coupled to a connecting member that is in turn coupled to the anchor assembly 56. As shown in the present embodiment, the connecting member can be a pivot member 58, such as a coil spring, that is configured to allow the shaft 54 to pivot relative to the anchor assembly 56 about at least one axis of the anchor assembly 56. In this manner, once the tool 50 is anchored to the seat track 22, an operator can pivot the shaft 54 as needed to ergonomically manipulate the air pallet 2, such as by pulling or towing the air pallet 2. In the present embodiment, the coil spring pivot member 58 is configured to allow polyaxial pivoting or angulation of the shaft 54 relative to the anchor assembly 56. The coil spring pivot member 58 can also be configured to return the shaft 54 to an upright, neutral position relative to the anchor assembly 56 (and thus also relative to the air pallet 2) once the operator releases the handle 52 from an angulated position. Accordingly, the pivot member 58 can also be characterized as a "return-member". The tool 2 is preferably configured such that, when the shaft 54 is in the neutral position, the shaft 54 and handle 52 are aligned vertically above the seat track 22 so that they do not occupy space overlying the main surface 4 of the pallet or extend horizontally outward from any of the ends 10, 12 or sides 14, 16 of the air pallet 2. In this manner, when in the neutral position, the tool 2 need not interfere with cargo loaded on the main surface 4 of the air pallet 2 or provide an obstacle for travel around the air pallet 2.

Additionally, the anchor assembly 56 includes a backstop member 57 configured to receive input forces from the shaft 54 as it pivots relative to the anchor assembly 58 via the pivot member 58. In particular, when the anchor assembly 56 is anchored to the seat track 22, the shaft 54 is configured to pivot and impinge against the backstop 57, allowing an operator to also conveniently and ergonomically push the air pallet 2.

Moreover, the tool 50 can also include an auxiliary handle, such as a tiller-type handle 59 (also referred to herein as a "tiller handle" 59), which can be rotatably coupled to the shaft 54 so as to be rotatable from a disengaged position, at which the tiller handle 59 extends parallel alongside the shaft 54, to an engaged position, at which the tiller handle 59 extends perpendicular or at least substantially perpendicular to the shaft 54. In this manner, the tiller handle 59 can provide a convenient moment arm allowing an operator to ergonomically rotate the air pallet 2 about a vertical axis as needed. Thus, the tool 50 of the present embodiment allows an operator to use the handle 52 in combination with the backstop 57 and tiller handle 59 to selectively pull, push, and rotate the air pallet on roller decking as needed.

Figure 2B:
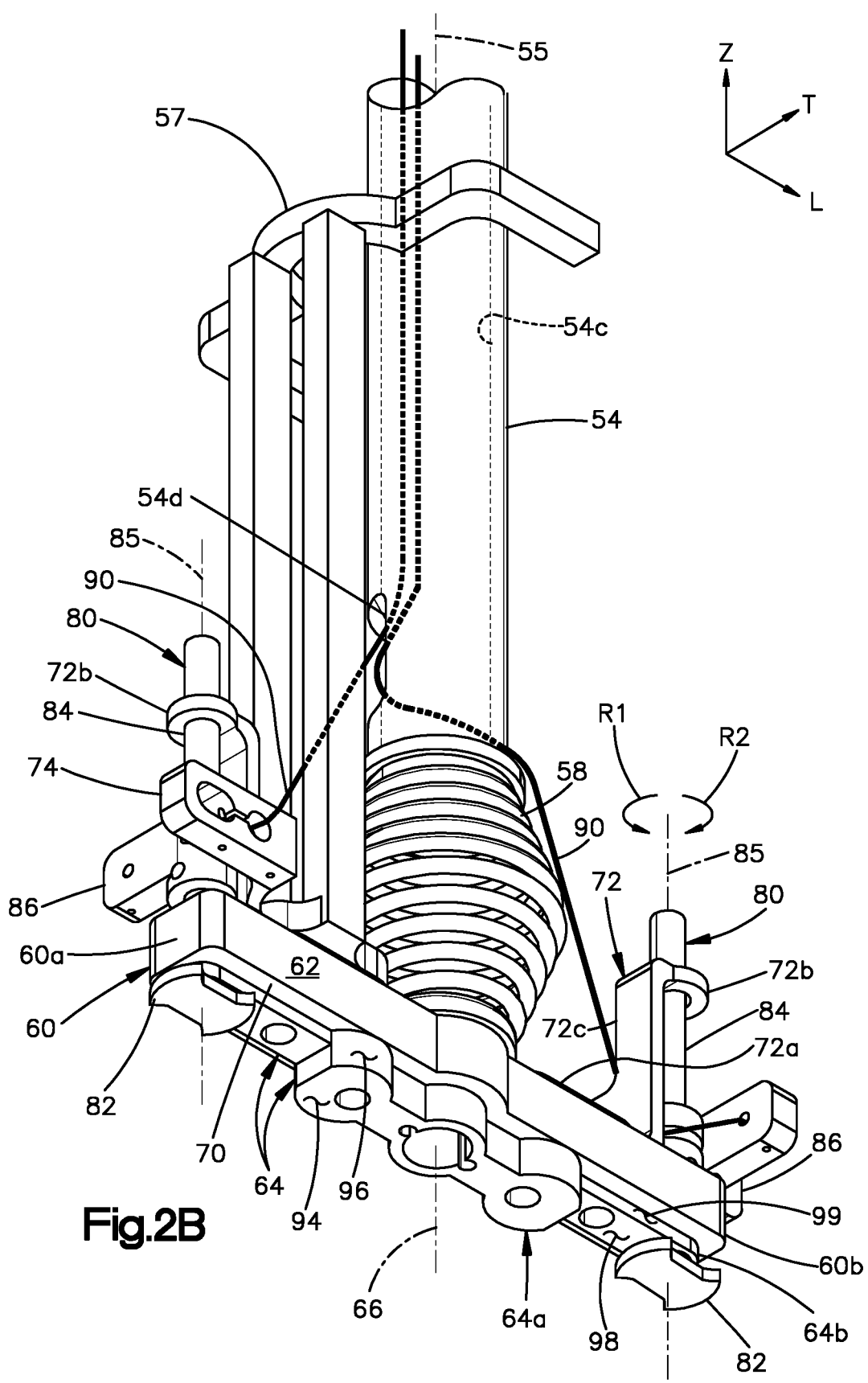
FIG. 2B shows a perspective view of an anchor assembly of the assistance tool illustrated in FIG. 2A, including locking members of the anchor assembly.
Figure 2C:
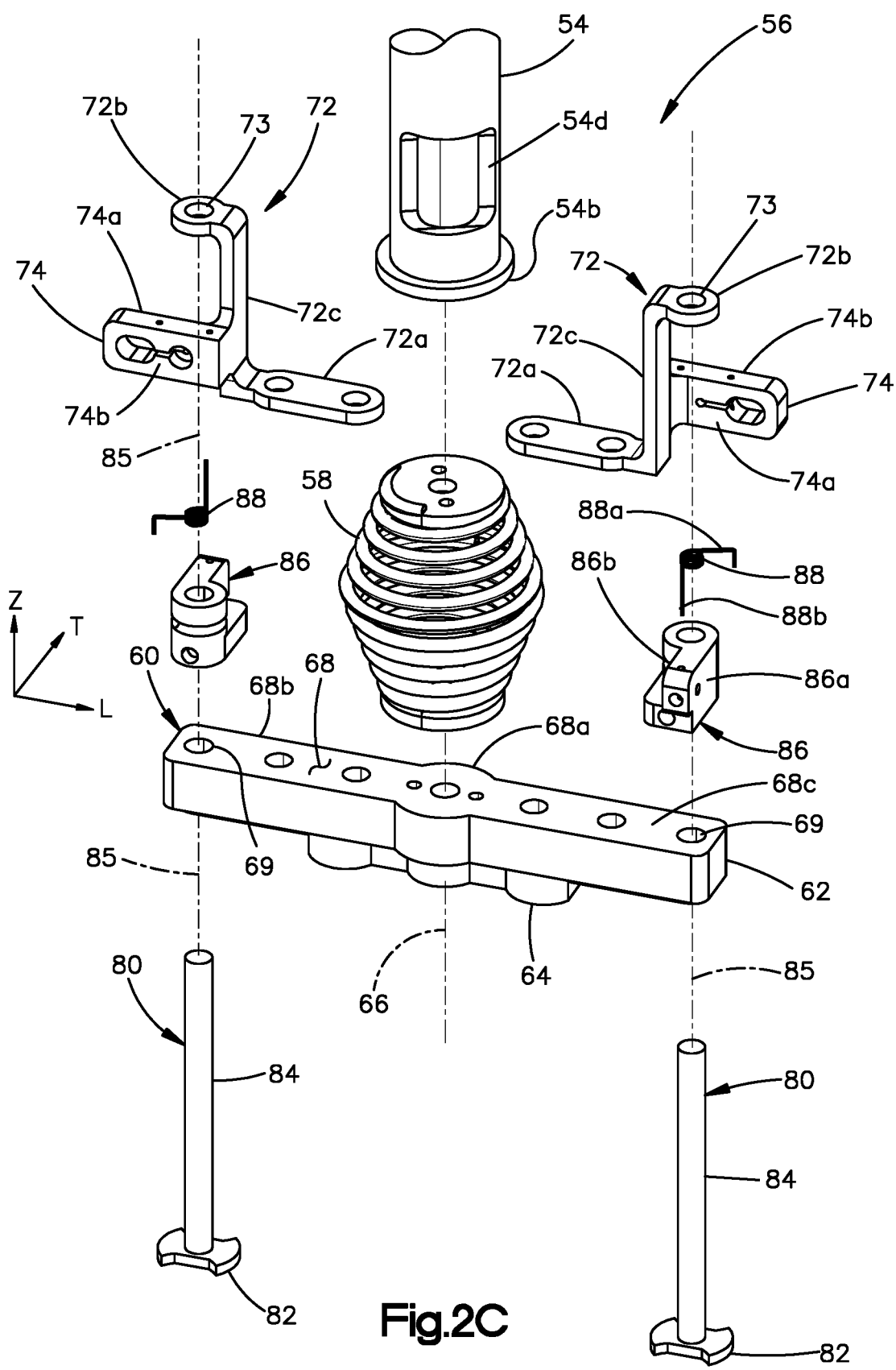
FIG. 2C shows an exploded, perspective view of some of the components of the anchor assembly illustrated in FIG. 2B.

Referring now to FIGS. 2B and 2C, the anchor assembly 56 includes a mounting member or "cleat" 60 that engages and interfaces with the seat track 22. Because the cleat 60 is configured to mate with the seat track 22, the cleat 60 will be described with reference to the longitudinal L and transverse directions T described above with reference to the seat track 22. The cleat 60 defines a first end 60a and a second end 60b spaced from each other along the longitudinal direction L. The cleat 60 includes a first or topside portion 62 that is configured to be disposed above the top track surface 28 and a second or insertion portion 64 that is configured to be inserted within the track slot 24 along a direction oriented along a central cleat axis 66. During insertion, the central cleat axis 66 is oriented along (or at least substantially along) the vertical direction Z. The central cleat axis 66 can be coincident with the longitudinal shaft axis 55 when the shaft 54 is at a neutral (i.e., non-angulated) position relative to the anchor assembly 56. In other embodiments, however, the central cleat axis 66 and the longitudinal shaft axis 55 can be offset from one another, including when the shaft 54 is at a neutral position.

The topside portion 62 of the cleat 60 defines a top cleat surface 68 and a first bottom cleat surface 70 spaced from each other along the vertical direction Z. The first bottom cleat surface 70 is configured to abut the top track surface 28 when the anchor assembly 56 is connected to the seat track 22. The top cleat surface 68 defines one or more mounting formations (also referee to herein simply as "mounts") for mounting additional components of the anchor assembly. For example, the top cleat surface 68 defines a first mount 68a for connecting the cleat 60 with the shaft 54. As shown in the illustrated embodiment, the first mount 68a can be configured to couple with the connecting member, particularly with a bottom portion of the pivot member 58.

It is to be appreciated that, in other embodiments, the connecting member can include a pivot joint, such as a universal joint (also referred to as a "U-joint"), for pivoting the shaft 54 relative to the anchor assembly 56. In one example of such an embodiment, the connecting member can include the coil spring pivot member 58 as shown, further including a U-joint that includes first and second mated U-joint members located within the coils of the spring, such that the first U-joint member is connected to the distal end 54b of the shaft 54 and also to a top end of the coil spring pivot member 58, while the second U-joint member is connected to the first mount 68a of the cleat 60 and also a bottom end of the coil spring pivot member 58. In this example embodiment, the U-joint can be configured to provide polyaxial pivoting of the shaft 54 relative to the cleat 60, while the coil spring pivot member 58 is a return-member for returning the shaft 54 to its upright, neutral position, as mentioned above. The first and second mated U-joint members can also advantageously absorb or otherwise distribute thermal loads applied to the connecting member, such as in any embodiments where one or more components or features of the connecting member are welded to any other components of the tool 2. The first and second mated U-joint members can be formed of a material that comprises polyethylene, by way of a non-limiting example.

The top cleat surface 68 also defines at least one additional mount, such as a second mount 68b and a third mount 68c on opposite sides of the first mount 68a with respect to the longitudinal direction L. Thus, the first mount 68a can be characterized as being intermediate the second and third mounts 68b, c along the longitudinal direction L. The second and third mounts 68b, c are configured to connect respective locking members 80 to the cleat 60, as described in more detail below. At the second and third mounts 68b, c, the cleat 60 can define respective bores 69 that extend through the cleat 60 along the vertical direction Z. The bores 69, and thus the locking members 80, can be located at the ends 60a, 60b of the cleat 60.

The second and third mounts 68b, c can also be configured to couple with respective support brackets 72 that support the respective locking members 80. Each support bracket 72 can be a Z-type bracket having a first bracket arm 72a configured to engage the respective second or third mount 68b, c of the cleat 60. For example, the first bracket arm 72a can define one or more fastener holes (such as for receiving screws or bolts, for example) configured to align with a corresponding one or more fastener holes of the second and third mounts 68b, c of the cleat 60. It is to be appreciated that the backstop 57 can mount to a top surface of the first bracket arm 72a of one of the support brackets 72. In this manner, the backstop 57 is rigidly coupled to the cleat 60 and extends upwardly from the cleat 60. Each support bracket 72 includes a second bracket arm 72b extending parallel with the first bracket arm 72a and defining a feature, such as a bore 73, that extends along the vertical direction Z and is aligned with the respective bore 69 of the cleat 60. The first and second bracket arms 72a, b are spaced from each other along the vertical direction Z by a central bracket arm 72c. Each support bracket 72 can also include a stop member, such as a flange 74, that extends from the central bracket arm 72c along the longitudinal direction L. The flange 74 can define a first or contact side surface 74a and a second side surface 74b opposite each other along the transverse direction T.

Each locking member 80 of the anchor assembly 56 is configured to extend from the cleat 60 and into the track slot 24 and is movable between an unlocked position and a locked position. The insertion portion 64 of the cleat 60 is configured to be inserted into the track slot 24 with the locking members 80 in the unlocked position and, after inserted, the locking members 80 can be moved to the locked position, in which the cleat 60 (and thus the anchor assembly 56 and thus also the tool 50) is locked in anchorage to the seat track 22. To un-couple the tool 2 from the seat track 22, the locking members 80 are moved to the unlocked position, in which the cleat 60 can be withdrawn from the seat track 22.

Each locking member 80 can include a locking head 82 coupled to a lock shaft 84. Each lock shaft 84 can be elongated along a lock shaft axis 85. The lock shafts 84 extend through the bores 69 at the second and third mounts 68b, c of the cleat 60. The lock shafts 84 also extend through the bores 73 in the second bracket arms 72b of the support brackets 72. In this manner, the support brackets 72 can be employed as respective rotary bearings, such as a plain bearings, for the lock shafts 84. The locking members 82 can also include abutment members 86 that extend outwardly from their lock shafts 84 and are configured to interact with the stop flange 74 of the support bracket 72. Each abutment member 86 can define a first or contact surface 86a and an opposite second surface 86b. The contact surfaces 86a of the abutment members 86 are configured to face the respective contacts surfaces 74a of the stop flanges 74. Interaction between the abutment members 86 and the stop flanges 74 will be described in more detail below.

Figure 2D:
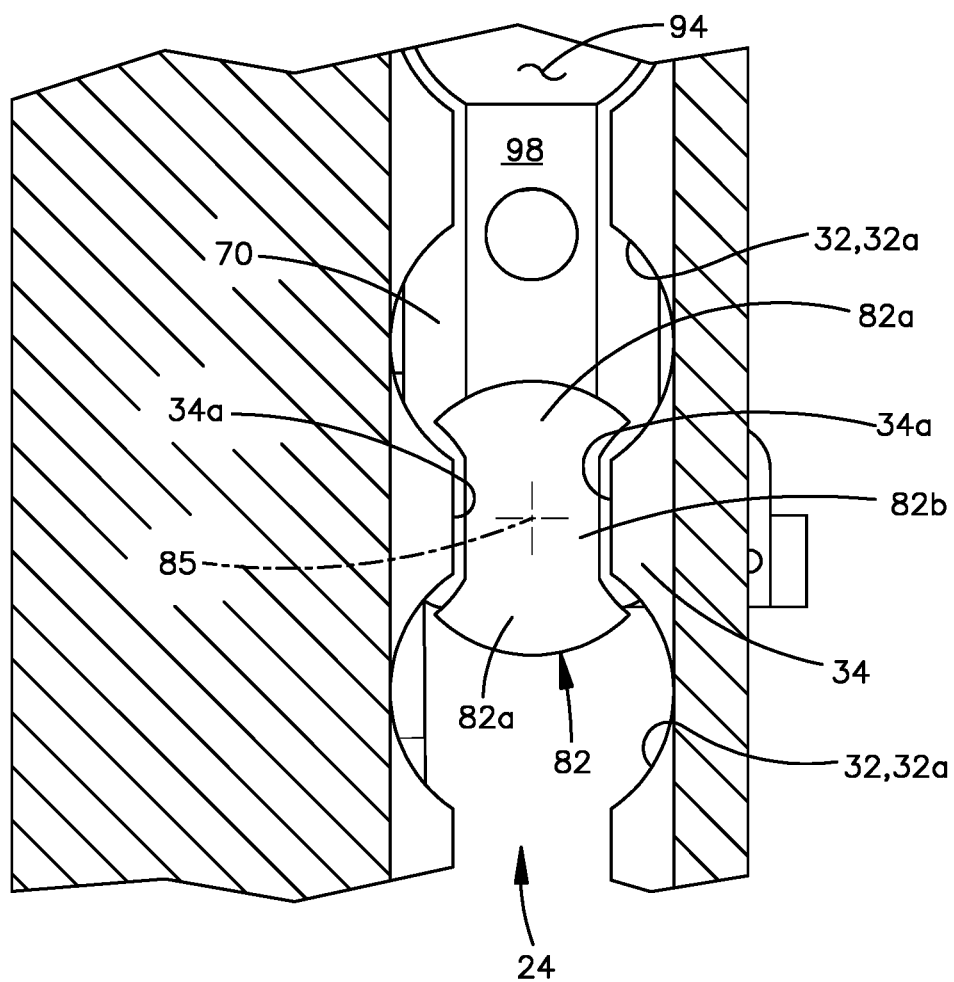
FIG. 2D shows a sectional bottom view of a portion of the anchor assembly coupled to the seat track taken illustrated in FIG. 2A, taken along a horizontal sectional plane that intersects locking heads of the locking members.
Figure 2E:
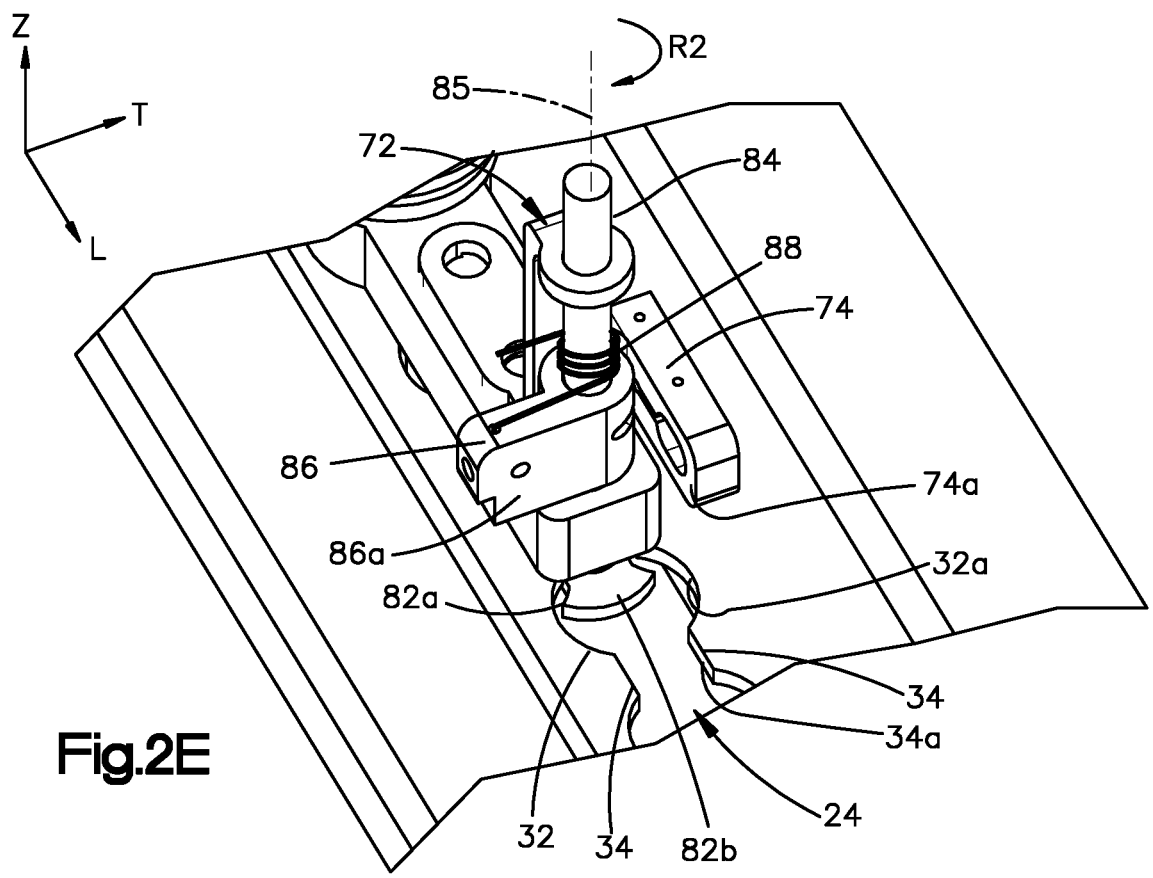
FIG. 2E shows a perspective view of a locking member of the anchor assembly illustrated in FIG. 2B in an unlocked position.
Figure 2F:
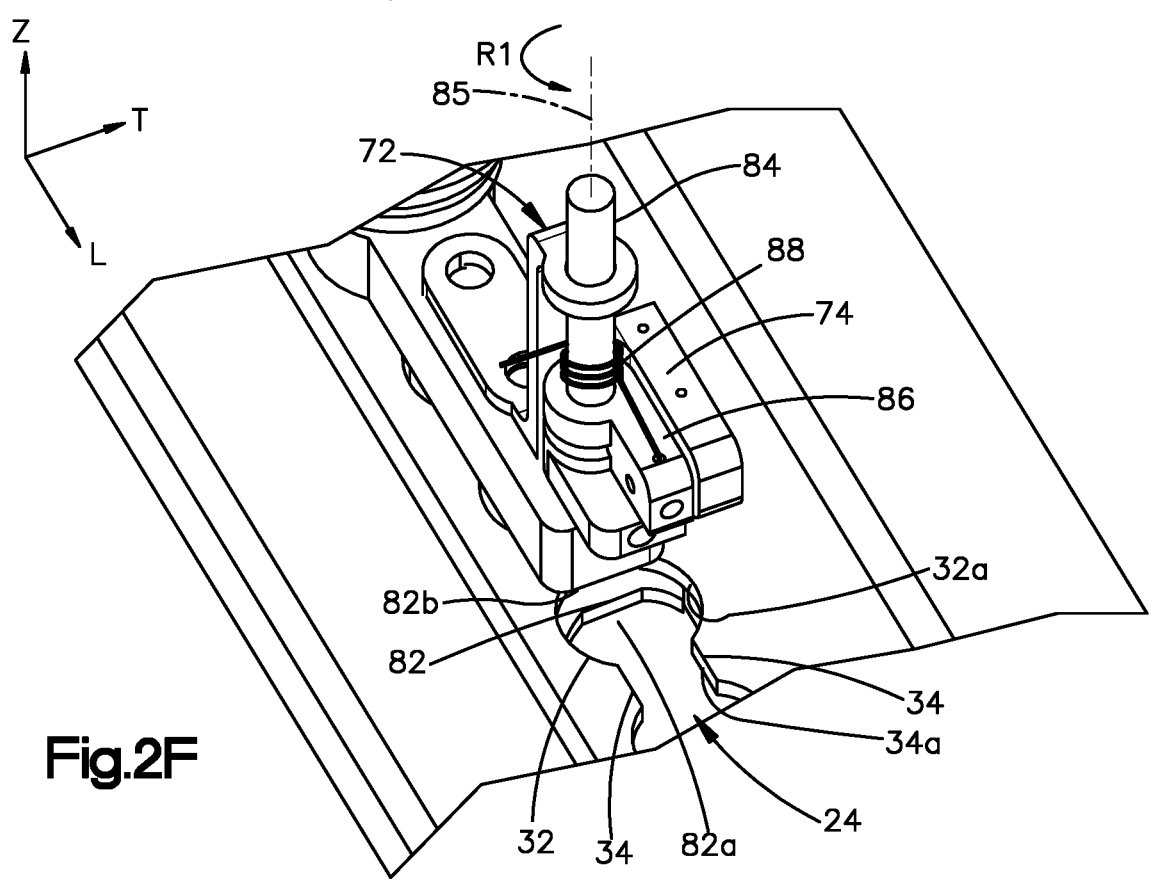
FIG. 2F shows a perspective view of the locking member illustrated in FIG. 2E in a locked position.

Referring now to FIGS. 2D through 2F, each locking head 82 of the present, illustrated embodiments has a profile in a horizontal reference plane complimentary with the profile of at least one lobe 34 of the seat track 22, and preferably complimentary with a pair of lobes 34 and portions of the longitudinally adjacent openings 32, such that when the locking heads 82 are in the unlocked position, they can advance into the track slot 24 substantially along the vertical direction Z and fit between the inner surfaces 34a of the pair of lobes 34. After the locking heads 82 reside below the lobe depth Z2, the locking heads 82 can be rotated in a first rotational direction R1 to the locked position, such as at 90 degrees about their respective lock shaft axes 85, so that at least a portion of each of the locking heads 82 underlies (and thus mechanically interferes with) the bottom lobe surfaces 34b of the pair of lobes 34 along the vertical direction Z, thereby locking the cleat 60 in anchorage to the seat track 22. From the locked position, the locking heads 82 can be rotated back, such as at 90 degrees in a second rotational direction R2 opposite the first rotational direction R1, to return to the unlocked position. Alternatively, from the locked position, the locking heads 82 can be rotated an additional 90 degrees in the first rotational direction R1 to move to the unlocked position.

In the present embodiments, the locking heads 82 can define an "I-shaped" profile in the horizontal reference plane, as shown in FIG. 2D. This I-shaped profile includes a pair of wider feet 82a spaced from each other by a narrower central leg 82b. In particular, the feet 82a can each have a geometry similar to at least a portion of an opening 32 of the seat track 22 and the leg 82b can have a geometry similar to the inner surfaces 34a of a pair of lobes 34 of the seat track 22. However, in other embodiments, the locking heads 82 can have other profiles that that be advanced below the lobe depth Z2 in the unlocked position and mechanically interfere with the lobes 34 along the vertical direction Z in the locked position.

The locking members 82 are preferably biased into the locked position. In the illustrated embodiment, a biasing member, such as a torsion spring 88, engages each abutment member 86 of the locking member 80 and the associated stop flange 74 of the support bracket 72. In particular, the torsion spring 88 includes a first arm 88a and a second arm 88b that are spaced from each other by about 90 degrees when the torsion spring 88 is in a neutral position. The torsion spring 88 is disposed relative to the abutment member 86 and the stop flange 74 so that the first arm 88a engages the abutment member 86 and the second arm 88b engages the support bracket 72 in a manner exerting a torsional biasing force that biases the respective contact surfaces 86a, 74a of the abutment member 86 and the stop flange 74 together. To move the locking members 82 to the unlocked position, a second or "unlocking" force is applied to the abutment members 86 in the first rotational direction R1 (i.e., extending from the contact surface 74a of the stop flange 74 to the contact surface 86a of the abutment member 86), which unlocking force exceeds the opposite torsional biasing force which is in the second rotational direction R2. As shown, the first arm 88a of each torsion spring 88 can extend within a receptacle of the respective abutment member 86, such as an aperture on a top side of the abutment member 86. The second arm 88b of each torsion spring 88 can abut against a face of the central bracket arm 72c of the respective support bracket 72. It is to be appreciated that the torsion springs 88 can be coupled in alternative fashion to the support brackets 72 and abutment members 86.

The locking force is preferably supplied to each locking member 80 by a respective actuator, such as a tension wire 90 attached to the respective abutment member 86 and configured to move the abutment member 86 (and thus the locking member 80) in the first rotational direction R1 to the unlocked position. The tension wire 90 is thus anchored to the abutment member, such as at an anchor hole 86c extending from the contact surface 86a to the second surface 86b. The tension wire 90 extends from the abutment member 86, through the anchor assembly 56, through the side aperture 54a and up through the central bore 54c of the shaft and to an actuation controller, such as an actuation lever 92 coupled to the handle 52, by way of a non-limiting example. The actuation lever 92 is configured to be depressed in a manner pulling the tension wire 90, which causes the abutment member 86 (and thus the locking head 82) to move from the locked position to the unlocked position. In this manner, the tool 50 is configured so that an operator can depress the actuation lever 92 to place the locking members 82 in the unlocked position as the insertion portion 64 of the cleat 60 is inserted into the track slot 24. Once the insertion portion 64 is in the track slot 24 with the locking heads 84 below the lobe depth Z2, the operator can simply release the actuation lever 92 to move the locking heads 84 to the locked position, thereby locking the cleat 60 in anchorage to the seat track 22. The tension wires 90 can also extend with respective sheaths that extend through at least a portion of the central bore 54c of the shaft 54 and can also extend to the second side 74b of each stop flange 74. It is to be appreciated that the tension wire 90 can be constructed similar to piano wire and can comprise materials used for piano wire, by way of non-limiting example. The design of the abutment member 86 and stop flange 74 also provides the advantage that the locking members 82 can be rotated to the unlocked position by manually rotating the abutment member 86 away from the flange 74 in the first rotational direction R1, such as with a finger or thumb. Thus, in some embodiments, the tool 50 need not include the actuation member 90 and actuation controller 92.

In other embodiments, the actuator 90 can be a torsion member, such as a torsion wire or torsion rod that extends, for example, from the handle 52 to at least one locking member 80. In such embodiments, the torsion member is connected to the at least one locking member 82 in a manner such that rotation of the torsion member responsively rotates the at least one locking member 82, at least between the locked and unlocked positions, such as from the locked position to the unlocked position. In such embodiments, the torsion member can extend through the central bore 54c of the shaft 54 to the actuation controller 92, which can be a knob, such as a thumb-wheel or dial, connected to the handle 52, such as at the handle-end of the central bore 54c. Thus, an operator can rotate the torsion member about its central axis by rotating the thumb-wheel, thereby rotating the at least one locking member 80 between the locked and unlocked positions. In one example of such an embodiment, the torsion member can be coupled to a central locking member 80 that extends along the central cleat axis 66 and has a locking head 82 poisoned below a central region of the insertion portion 64. In such an example, the central locking member 80 can be the sole locking member 80 of the anchor assembly, although, alternatively, one or more additional locking members 80, such as those depicted, can be employed with the central locking member 80. It is to be appreciated that yet other actuator types can be employed with the embodiments of the present disclosure.

Referring again to FIG. 2B, the insertion portion 64 of the cleat 60 preferably defines a shape or geometry that is complimentary with the shape of at least a portion of at least one of the openings 32 and/or at least one of the lobes 34. In particular, in the present embodiment, the insertion portion 64 defines a first insertion formation 64a extends from the first bottom surface 70 to a second bottom surface 94 of the cleat 60, which is configured to abut the bottom track surface 30 when the cleat 60 is coupled to the seat track 22. The first insertion formation 64a defines opposed side surfaces 96 that each have a geometry that is complimentary with one or more openings 32 and one or more lobes 34 of the seat track 22. In the present embodiment, each of the side surfaces 96 has a geometry complimentary with at least three openings 32 and at least two lobes 34. In this manner, the side surfaces 96 of the first insertion formation 64a can abut and brace against the inner surfaces 34a of the associated lobes 34 and the inner surfaces 34a of the associated openings 32 as bending moments are applied to the cleat 60 via the shaft 54 as the tool 50 is used to manipulate the air pallet 2.

The insertion portion 64 of the cleat 60 can also define a second insertion formation 64b that extends from the first bottom surface 70 to an intermediate surface 98 located between the first and second bottom surfaces 70, 94 with respect to the vertical direction Z. The intermediate surface 98 is spaced below the first bottom surface 70 of the cleat 60 by a vertical distance equivalent to or greater than the lobe depth Z2. The second insertion formation 64b also defines side surfaces 99 opposite each other along the transverse direction Y and spaced apart from each other along the transverse direction Y by a distance that is preferably substantially equivalent to or slightly less than the minor slot width W1. In this manner, the side surfaces 99 of the second insertion formation 64b can also abut and brace against the inner surfaces 34a of the associated lobes 34 as bending moments are applied to the cleat 60 via the shaft 54 as the tool 50 is used to manipulate the air pallet 2. Thus, the insertion portion 64 of the cleat 60, including the first and second insertion formations 64a, 64b thereof, provide enhanced stability and anchorage of the cleat 60, and thus the tool 50, to the air pallet 2 during manipulation thereof.

Referring now to FIG. 3A, a second example embodiment of an assistance tool 150 for anchoring to the air pallet 2 at the corner between intersecting seat tracks 22 will now be described. The tool 150 of the present embodiment is generally similar to the tool 50 described above with reference to FIGS. 2A through 2F. In particular, the tool 150 can employ the handle 52, shaft 54, and connecting member (such as the pivot member 58) described above. Additionally, the tool 150 includes an anchor assembly 156 that is similar in construction to the locking assembly 56 described above, with some differences to account for mounting to the corner between intersection seat tracks 22. The tools 150 of the present embodiment can be employed in a tool system 100 that includes more than one such tool 150, such as a pair of tools 150 anchored to adjacent corners of the air pallet 2. Alternatively, a single tool 150 can be employed at one of the corners of the air pallet 2. It is to be appreciated that the following description will focus on the differences in the construction of the anchor assembly 156 of the tool 150 according to the present embodiment.

Figure 3B:
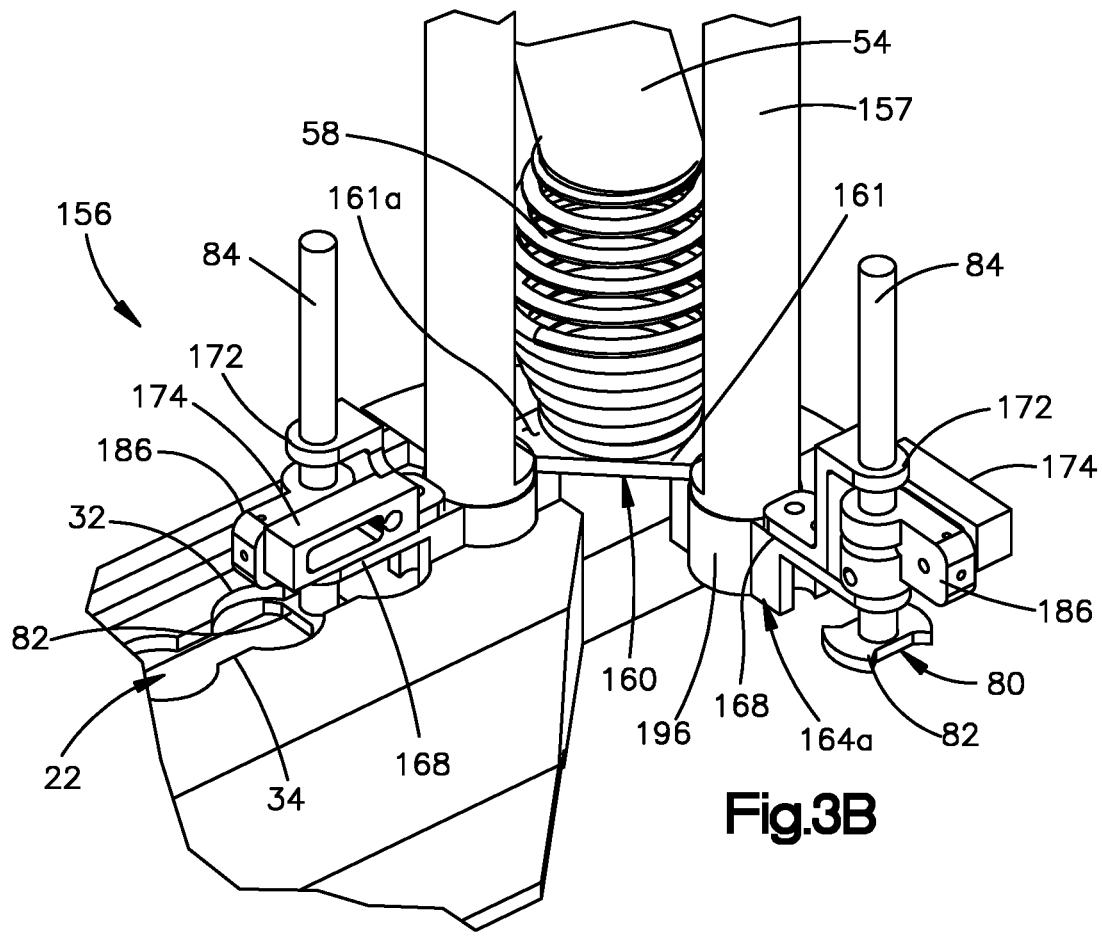
FIG. 3B shows an enlarged perspective view of a cleat of an anchor assembly of the tool illustrated in FIG. 3A.
Figure 3C:
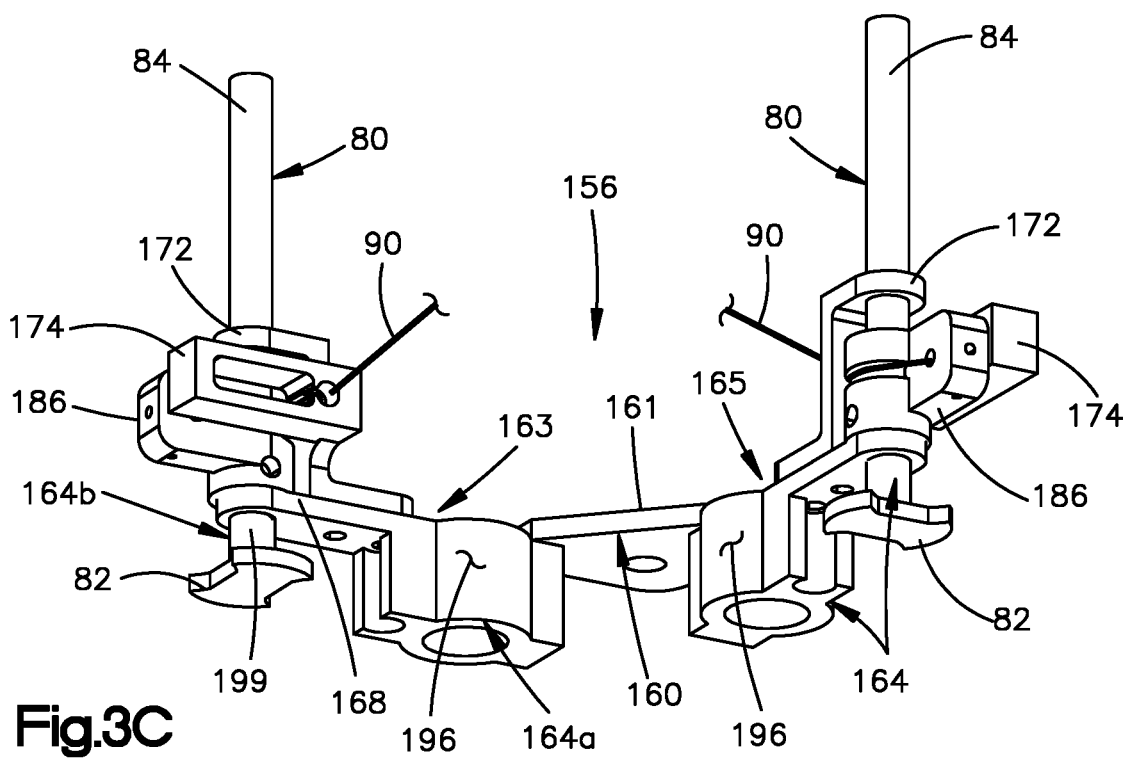
FIG. 3C shows another perspective view of the cleat illustrated in FIG. 3B.

Referring now to FIGS. 3B and 3C, the anchor assembly 156 includes a cleat 160 having a central member 161 and a first arm 163 and a second arm 165 extending from the central member 161 are a right angle to each other. The first and second arms 163, 165 are configured to engage adjacent seat tracks 22. Thus, it is to be appreciated that each arm 163, 165 can be characterized as a separate cleat. The central member 161 of the cleat 160 is configured to overlay the corner platform 23 between the seat tracks 22. The central member 161 defines a top surface 161a for mounting the pivot member 58 to the cleat 160. Each of the arms 163, 165 can be configured similar to the first and second ends 60a, 60b of the cleat 60 described above with reference to FIGS. 2B through 2F. In particular, the first and second arms 163, 165 each defines a top surface 168 having mounting formations for mounting support brackets 172 that couple the locking members 80 to the arms 163, 165, respectively. It is to be appreciated that the support brackets 172 of the present embodiment can be configured similar to the support brackets 72 described above. Accordingly, the support brackets 172 have stop flanges 174 that are similar to those described above and thus interact with abutment members 186 extending from the shafts 84 of the locking members 80. Additionally, the locking members 80 can function similarly as described above to move between the locked and unlocked position, as actuated by actuators that are controlled by actuation controllers. Portions of the top surfaces 168 of the arms 163, 165 also have mounting formations for mounting the backstop 57 and other structures, such as the support brackets 172, to the cleat 160. As above, the locking heads 84 of each locking member 80 are configured to rotate from an unlocked position, in which the I-shaped profiles of the locking heads 84 can advance between a pair of lobes 34 substantially along the vertical direction, and the locked position, in which the locking heads 84 mechanically interfere with the bottom surfaces 34b of the associated lobes 34 so that the cleat 160 (and thus the tool 50) is locked in anchorage to the associated seat track 22.

Each of the first and second arms 163, 165 of the cleat 160 includes an insertion portion 164 having a first insertion formation 164a that is configured to extend to the bottom track surface 30 and a second insertion formation 164b configured to fit between the inner surfaces 34a of the associated lobes 34. The first insertion formation 164a defines opposed side surfaces 196 that each have a geometry complimentary with one or more openings 32 and one or more lobes 34 of the seat track 22. In the present embodiment, each of the side surfaces 196 has a geometry complimentary with one opening 32 and two lobes 34, although the side surfaces 196 could be lengthened to accommodate more openings 32 and/or lobes 32. The second insertion formation 164b of the present embodiment defines a cylindrical outer surface 199 configured to fit between the inner surfaces 34a of associated pairs of lobes 34. As above, the side surfaces 196 of the first insertion formation 164a can abut and brace against the inner surfaces 34a of the associated lobes 34 and the inner surfaces 34a of the associated openings 32, while the cylindrical outer surface 199 of the second insertion formation 164b can abut and brace against the inner surfaces 34a of the associated lobes 34, as bending moments are applied to the cleat 160 via the shaft 54 as the tool 150 is used to manipulate the air pallet 2.

Figure 4A:
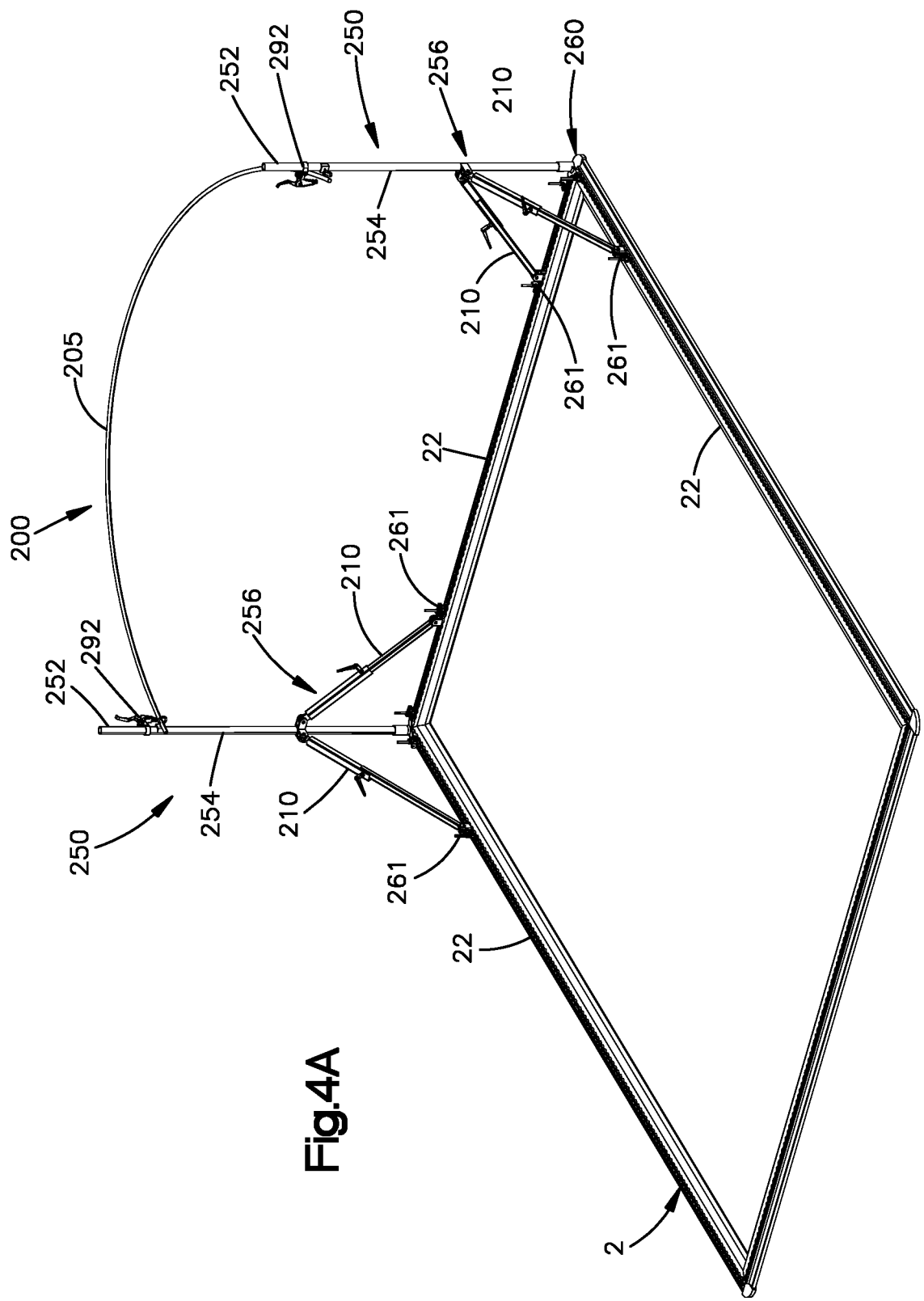
FIG. 4A shows a perspective view of an assistance tool system that includes a pair of assistance tools anchored to the corner of the air pallet illustrated in FIG. 1A for manually manipulating the air pallet, wherein each of the assistance tools has a tripod anchor assembly, according to another embodiment of the present disclosure.

Referring now to FIG. 4A, an assistance tool system 200 is shown that includes a pair of assistance tools 250 each having a tripod configuration for anchoring to the adjacent corners of the air pallet 2. The system 200 includes a pull-cable or rope 205 extending between the tools 250 for manipulating the pallet 2. For example, one or more associates can pull the air pallet 2 across roller decking by pulling on the rope 205. Each tool 250 includes a shaft 254, which can define a handle 252 at its top end. The shaft 154 of each tool 250 is also coupled to a tripod anchor assembly 256, which includes a central cleat 260 rigidly coupled to the bottom end of the shaft 254, and a pair of secondary cleats 261 coupled to the ends of a respective pair of legs 210 extending from the shaft 254. It is to be appreciated that each of the central cleat 260 and the secondary cleats 261 can be configured to employ the locking members 82 described above with reference to FIGS. 2B through 2F. Additionally, the shaft 254 of each tool 250 can also carry an actuation lever 292 connected to tension wires that actuate rotation of the locking members 82 of the central cleat 260, similar to the manner described above.

Referring now to FIGS. 4B and 4C, the central cleat 260 is similar to the cleat 160 described above with reference to FIGS. 3B and 3C. In particular, the central cleat 260 of the present embodiment has a central member 261 overlaying the corner platform 23 between intersecting seat tracks 22. The cleat 260 includes first and second arms 263, 265 that extending from the central member 261 at a right angle to each other and are configured to engage the adjacent seat tracks 22. Thus, it is to be appreciated that each arm 263, 265 can be characterized as a separate cleat. The central member 261 defines an upwardly extending cylindrical receptacle 212 for receiving the bottom end of the shaft 254. Each of the arms 263, 265 also defines a top surface 268 having mounting formations for mounting support brackets 272 that support the locking members 80 of the arms 263, 265. It is to be appreciated that the support brackets 272 of the present embodiment can be configured similar to the support brackets 72 described above. Additionally, the locking members 80 can function similarly as described above to move between the locked and unlocked position, as actuated by the tension wires responsive to depression and release of the actuation lever 292.

Each of the first and second arms 263, 265 of the central cleat 260 includes an insertion portion 264 having a first insertion formation 264a that is configured to extend to the bottom track surface 30 and a second insertion formation 264b configured to fit between the inner surfaces 34a of the associated lobes 34. It is to be appreciated that the insertion portion 264 of the present embodiment, including the first and second insertion formations 264, 264b thereof, can be configured similarly to (and can function similarly to) their respective counterparts 164, 164a, 164b described above.

The legs 210 extend from a leg bracket 214 coupled to the shaft 254. In particular, each leg 210 is rotatably coupled to the leg bracket 214 via respective pin joints 216. Each of the legs 210 also includes a first leg portion 220 and a second leg portion 222 telescopically adjustable relative to each other so that the length of each leg 210 can be adjusted as necessary, such as to anchor the respective secondary cleat 261 to the associated seat track 22 at a location to avoid interference with the retention net. The first leg portion 220 extends from the leg bracket 214, and the second leg portion 22 extends from the first leg portion 220 to the secondary cleat 261. Each leg 210 preferably also includes an adjustment feature for selectively inhibiting and allowing telescopic movement of the first and second portions 220, 222 of the leg 210 relative to each other. Such an adjustment feature can be a torsion lever 224, as shown, mounted to the first portion 220. The torsion lever is coupled to an arrestor, such as a set screw configured to advance into and out of arresting engagement with the second leg portion 222 responsive to rotation by the torsion lever 224. In this manner, an operator can manipulate the torsion lever 224 as needed to adjust the respective leg 210 to the necessary length for anchoring to the respective seat track 22 at the desired location.

Referring now to FIG. 4D, each secondary cleat 261 can include a pin joint formation 267 that forms a rotational pin joint 269 with the lower end of the second leg portion 222. Thus, each secondary cleat 261 can rotate as necessary relative to the associated leg 210 to be inserted within the track slot 24. Each secondary cleat 261 includes an anchor portion 271 disposed below the point joint formation 267. The anchor formation 271 can be configured similarly to the associated first or second arm 263, 265 of the central cleat 260. Accordingly, the anchor portion 271 of each secondary cleat 261 can include the insertion portion 264 having the first and second insertion formations 264a, 264b described above. Additionally, the anchor portion 271 of each secondary cleat 261 can include a mounting formation for receiving the locking member 80 and the supporting support bracket 272 described above. The locking members 82 of the secondary cleats 261 can be actuated to the unlocked position via additional tension wires, which can be coupled to the actuation lever 292 or to a separate actuation lever. Moreover, the locking members 82 of the secondary cleats 261 can be unlocked by manually pinching the abutment member 86 towards the flange 274. Thus, the secondary cleats 261 can alternatively be employed without tension wires.

Referring now to FIG. 5A, an assistance tool 350 is shown that includes a primary handle 352 attached to a first end 354a of a shaft 354 and a secondary or auxiliary handle 310 coupled to a retractable strap 312, which can also be referred to as an "extension member". The second end 354b of the shaft 354 is coupled to an anchor assembly 356 having a cleat 360 carrying a locking member 380, which will be discussed in more detail below. The retractable strap 312 is coupled to a spool assembly 316 that is configured to discharge a progressive length of the strap 312 responsive to tension applied to the auxiliary handle 310 until an effective total length of the strap 312 is discharged, and also to automatically retract the strap 312 within the spool assembly 316 responsive to removal of the tension.

Referring now to FIGS. 5B through 5D, the cleat 360 defines an insertion portion 364 configured to reside within at least a portion of the track slot 24. The cleat 360 includes a mounting formation, such as a saddle 368, configured to receive the locking member 380. The locking member 380 of the present embodiment has a pair of legs 382 that straddle the saddle 368. A biasing member, such as a spring member 385, is configured to bias the locking member 380 downward relative to the cleat 360 so that the legs 382 extend into one of the openings 32 in the seat track 22 in a manner anchoring the cleat 360 to the seat track 22. In the present embodiment, the spring member 385 is a compression spring located within a vertical slot 390 defined in the cleat 360 below the saddle 368. A first end of the spring member 385 impinges against a top end 394 of the slot 392 and a second end of the spring member 385 impinges against a transverse pin 396 extending between the legs 388 of the locking member 380 in a manner biasing the locking member 380 downward along the vertical direction Z relative to the cleat 360, particularly so that the locking member 360 is biased against the saddle 368.

The anchor assembly 356 of the present embodiment is configured so that the insertion portion 364 can be inserted in a track slot 24, along the vertical direction Z. The insertion portion 364 includes a first insertion formation 364a that has an outer surface 399 having a geometry complimentary with one or more lobes 34 and/or one or more openings 32 of the seat track 22, whereby the first insertion formation 364*a* can underlie the lobes 34. The insertion portion 364 includes a second insertion formation 364*b* configured to be positioned between adjacent inner surfaces 34*a* of a pair of lobes 34. The first insertion formation 364*a* is configured so that its complimentary outer surface 399 is spaced from the legs 382 of the locking member 380 along the longitudinal direction L so that when the complimentary outer surface 399 advances through an opening 36 along the vertical direction Z, the lower ends 388 of the legs 382 will impinge against the top track surface 28 at a pair of lobes 34, thereby causing the anchor member 380 to move upward relative to the saddle 368 (and thus also relative to the cleat 360), until the insertion portion 364 is fully seated in the track slot 24. From this position, the cleat 360 can be translated along the longitudinal direction L to a second longitudinal position at which the lower ends 388 of the legs 382 overlay an opening 36 and the complimentary outer surface 399 of the first insertion formation 364*a* underlies a pair of lobes 34. At the second longitudinal position, the spring member 385 will push the anchor member 380 downward until the legs 382 are fully seated on the saddle 368 (and thus fully seated in the opening 36). Outer surfaces 390 of the legs 382 have a shape complimentary with that of the inner surfaces 36*a* of the openings 36, thus locking the locking member 380 in anchorage in a longitudinal position relative to the seat track 22, while the complimentary outer surface 399 of the first insertion formation 364*a* mechanically interferes with undersides 34*b* of the lobes 34, further anchoring the cleat 360 to the seat track. To unlock the anchor assembly 356, an operator can lift the locking member 380 upwards against the spring member 385 by exerting an upward forces against a lift tab 395 extending from the locking member 380, thereby pulling the legs 382 out of the respective opening 36. With the legs 382 removed from the respective opening, the operator can slide the cleat 360 along the longitudinal direction L until the complimentary outer surface 399 is vertically aligned with a respective opening 36, at which location the operator can lift the insertion portion 364 of the cleat 360 from the seat track 22.

It is to be appreciated that any of the assistance tools 50, 150, 250, 350 described above can be employed together with any other of the tools 50, 150, 250, 350 as needed.

It is also to be appreciated that any of the tools described above, particularly the cleats 60, 160, 260, 261, 360 thereof, can be configured to include one or more frangible portions designed to break or otherwise fail mechanically if a threshold stress or strain is exceeded by the cleat. In this manner, the tools can be configured to break or otherwise fails before causing damage to any seat track 22 to which they are attached.

It is further to be appreciated that the assistance tools described herein are not limited for use with air cargo. These assistance tools can be employed in any cargo system that involves manipulation of ULDs on roller decking, such as maritime cargo (including on both surface vessels and submarines), as well as overland cargo, such as trucks and rail cargo, and even spaceflight cargo.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A tool for manually manipulating air craft pallets on roller decking, the tool comprising:
    a handle configured to be gripped manually by an air cargo operator;
    an shaft extending from the handle; and
    an anchor assembly coupled to the shaft opposite the handle, the anchor assembly configured for selective anchoring to a seat track of the air pallet, the anchor assembly including at least one lock that is movable between an unlocked position and a locked position, wherein,
        in the unlocked position, the at least one locking member is configured to advance into a slot of the seat track, and
        in the locked position, the at least one lock is configured to mechanically interfere with at least a portion of the seat track in a manner retaining the at least one lock in the slot, thereby anchoring the anchor assembly to the seat track so that the air cargo operator can manually manipulate the air pallet with the tool across the roller decking.

2. The tool of claim 1, wherein the at least one lock comprises two or more lock each configured to lock the anchor assembly to the seat track.

3. A tool, comprising:
    a handle;
    an extension member extending from the handle; and
    an anchor assembly coupled to the extension member opposite the handle, the anchor assembly configured for selective anchoring to a seat track of an air cargo pallet, the anchor assembly including at least one locking member that is movable between an unlocked position and a locked position, wherein,
        in the unlocked position, the at least one locking member is configured to advance into a slot of the seat track, and
        in the locked position, the at least one locking member is configured to mechanically interfere with at least a portion of the seat track in a manner retaining the at least one locking member in the slot, thereby anchoring the anchor assembly to the seat track.

4. The tool of claim 3, wherein the at least one locking member is configured to move between the locked and unlocked position by rotating about a vertical axis defined by the at least one locking member, such that:
    in the unlocked position, the at least one locking member is configured to advance into the slot of the seat track between inner surfaces of one or more adjacent pairs of lobes of the seat track that overhang portions of the slot, and in the locked position, the at least one locking member is configured to underly undersides of the lobes in a manner mechanically interfering with the undersides of the lobes along the vertical direction, thereby retaining the at least one locking member in the slot to anchor the anchor assembly to the seat track.

5. The tool of claim 4, wherein the at least one locking member is biased into the locked position, and the tool further comprises an actuator configured to move the at least one locking member from the locked position to the unlocked position, wherein the actuator is connected to an actuation controller attached to the handle, wherein the actuation controller is configured to control movement of the actuator so as to move the at least one locking member.

6. The tool of claim 4, wherein the anchor assembly includes a mounting member having a top portion configured to be disposed above the seat track and an insertion portion configured for insertion within the slot, and the at least one locking member extends below the top portion.

7. The tool of claim 6, wherein the insertion portion defines a geometry complimentary with the lobes and openings of the seat track.

8. The tool of claim 6, wherein the anchor assembly further comprises a backstop rigidly coupled to the mounting member and extending upwardly from the mounting member, wherein the extension member is configured to impinge against the backstop while the at least one locking member is in the locked position so as to push the air cargo pallet with the tool.

9. The tool of claim 6, further comprising a connecting member coupling the extension member to the mounting member, wherein the connecting member is configured to allow polyaxial movement of the extension member relative to the mounting member.

10. The tool of claim 6, wherein the mounting member has a first end and a second end opposite one another, and the at least one locking member includes a first locking member at the first end and a second locking member at the second end.

11. The tool of claim 10, wherein the insertion portion of the mounting member defines a geometry complimentary with at least three openings and at least two pairs of lobes of the seat track.

12. The tool of claim 4, further comprising an auxiliary handle coupled to the extension member, wherein the auxiliary handle is movable between a first position and a second position, such that, in the first position, the auxiliary handle extends parallel with the extension member, and, in the second position, the auxiliary handle is perpendicular to the extension member so as to provide a lever for further manipulating the air pallet with the tool.

13. A tool system including the tool of claim 4, wherein the tool is a first tool, and the tool system includes a second tool that comprises:
a second handle;
a second extension member extending from the second handle;
a second anchor assembly configured for selective anchoring to the seat track of the air pallet, the second anchor assembly including at least one second locking member that is rotatable between an unlocked position and a locked position, wherein,
in the unlocked position, the at least one second locking member is configured to advance into a slot of the seat track through one or more openings defined between adjacent pairs of lobes of the seat track that overhang portions of the slot, and
in the locked position, the at least one second locking member is configured to abut undersides of the lobes in a manner retaining the at least one second locking member in the slot, thereby anchoring the second anchor assembly to the seat track.

14. The tool system of claim 13, further comprising a rope extending from the extension member of the first tool to the second extension member of the second tool, wherein the rope is configured to be pulled by an operator so as to pull the air cargo pallet across roller decking, and the anchor assembly of the first tool and the second anchor assembly of the second tool are each configured to be anchored to adjacent corners of the seat track.

15. The tool system of claim 14, wherein the anchor assembly of the first tool and the second anchor assembly of the second tool each includes a pair of legs extending from a leg mount coupling on the respective extension member to first and second respective foot anchors, wherein each of the first and second respective foot anchors includes at least one foot locking member that is rotatable between a foot unlocked position and a foot locked position, wherein,
in the foot unlocked position, the at least one foot locking member is configured to advance into a slot of the seat track through one or more openings defined between adjacent pairs of lobes of the seat track that overhang portions of the slot, and
in the foot locked position, the at least one foot locking member is configured to abut undersides of the lobes in a manner retaining the at least one foot locking member in the slot, thereby anchoring the respective first and second anchors to the seat track.

16. The tool system of claim 15, wherein each of the legs includes a first leg portion that is coupled to the leg mount coupling and a second leg portion that is coupled to the respective foot anchor, wherein the first and second leg portions are configured for selective telescopic movement relative to each other.

17. The tool of claim 3, further comprising an auxiliary pull handle assembly that comprises:
an auxiliary pull handle;
a spool assembly coupled to the extension member or the anchor assembly; and
a strap connecting the auxiliary pull handle to the spool assembly, wherein the spool assembly is configured to 1) discharge a progressive length of the strap responsive to tension applied to the auxiliary pull handle until an effective total length of the strap is discharged, and 2) automatically retract the strap within the spool assembly responsive to removal of the tension.

18. A method, comprising:
attaching an anchor assembly of a tool comprising a handle attached to an elongated shaft to a seat track of an air cargo pallet; and
manipulating the handle of the tool in a manner causing the air cargo pallet to move across roller decking, wherein the shaft connects the handle to the anchor assembly.

19. The method of claim 18, wherein the attaching step comprises:
inserting at least a portion of the anchor assembly into the seat track while at least one locking member of the anchor assembly is in an unlocked position; and
moving the at least one locking member to a locked position after the inserting step.

20. The method of claim 18, wherein the manipulating step comprises at least one of 1) pulling the handle so as to pull the air cargo pallet across the roller decking, 2) pushing the handle so as to push the air cargo pallet across the roller decking, and 3) rotating the handle so as to rotate the air cargo pallet across the roller decking about an axis extending orthogonal to a cargo support surface of the air cargo pallet.

\* \* \* \* \*